United States Patent
Shook et al.

(10) Patent No.: US 11,847,675 B2
(45) Date of Patent: Dec. 19, 2023

(54) METHOD AND SYSTEM FOR FACILITATING A MARKETPLACE FOR LABOR ARBITRAGE

(71) Applicants: Bill Borden Shook, Temecula, CA (US); David Cho, Oxnard, CA (US)

(72) Inventors: Bill Borden Shook, Temecula, CA (US); David Cho, Oxnard, CA (US)

(*) Notice: Subject to any disclaimer, the term of this patent is extended or adjusted under 35 U.S.C. 154(b) by 0 days.

(21) Appl. No.: 17/535,553

(22) Filed: Nov. 24, 2021

(65) Prior Publication Data

US 2022/0180416 A1    Jun. 9, 2022

Related U.S. Application Data

(60) Provisional application No. 63/117,925, filed on Nov. 24, 2020.

(51) Int. Cl.
*G06Q 30/06* (2023.01)
*G06Q 30/0601* (2023.01)
(Continued)

(52) U.S. Cl.
CPC ..... *G06Q 30/0611* (2013.01); *G06Q 30/0619* (2013.01); *H04L 9/3247* (2013.01); *G06Q 2220/00* (2013.01); *H04L 9/50* (2022.05)

(58) Field of Classification Search
CPC .......... G06Q 30/0611; G06Q 30/0619; G06Q 2220/00; H04L 9/50; H04L 9/3247
(Continued)

(56) References Cited

U.S. PATENT DOCUMENTS 11,373,174 B1 * 6/2022 Cunningham ... G06Q 20/38215
11,514,457 B2 * 11/2022 Turgman ................ G06Q 20/02
(Continued)

FOREIGN PATENT DOCUMENTS

CN    109409831 A  *  3/2019  .......... G06Q 10/105
CN    110599111 A    12/2019
(Continued)

OTHER PUBLICATIONS

Pillai Shalina; India offers most crypto jobs in APAC ; Published in Times Business the Times of India (Online) New Delhi India Apr. 12, 2018 retrieved from Dialog on Mar. 24, 2023 (Year: 2018).*

*Primary Examiner* — Yogesh C Garg

(57) ABSTRACT

An innovative system and method is implemented to facilitate a blockchain based labor arbitrage. The system uses a processor to manage labor arbitrage between business operator devices and laborer devices. The method starts with a description for a job request received from a business operator device. After distributing the job description, the method receives proposals from the laborer devices. Then method matches a primary laborer device to the job description and generates a smart contract in the blockchain between the business operator device and the primary laborer device. Upon job completion, the method verifies that all job requirements plus quality standards are satisfactorily met and signatures of both the business operator device and the primary laborer device are validated, the method transmits a compensation of a predetermined type and amount of cryptographic token to the primary laborer device. With any disputes, the method further provides an arbitration process.

20 Claims, 17 Drawing Sheets

(51) Int. Cl.
*H04L 9/32* (2006.01)
*H04L 9/00* (2022.01)

(58) Field of Classification Search
USPC .......................................................... 705/26.4
See application file for complete search history.

(56) References Cited

U.S. PATENT DOCUMENTS

2018/0307859 A1* 10/2018 LaFever .................. H04L 63/20
2019/0034404 A1* 1/2019 Anderson .............. G06Q 50/18
2019/0227850 A1* 7/2019 Chapman ................ G06F 9/455
2019/0303920 A1 10/2019 Balaraman et al.
2020/0027067 A1 1/2020 Hertzog et al.

FOREIGN PATENT DOCUMENTS

| KR | 20200080032 A | * | 7/2020 | ............. G06Q 10/06 |
| KR | 20200092486 A | * | 8/2020 | ......... G06Q 10/1053 |
| KR | 20200093089 A | * | 8/2020 | ......... G06Q 30/0207 |

* cited by examiner

Example: Scalar liquidity ($\lambda$) rule based on bid ($B_0$) to ask ($A_0$) spread $$f(\lambda) \begin{cases} (1+\beta)B_0 - A_0 \geq 0, 1 \\ (1+\beta)B_0 - A_0 < 0, 0 \end{cases} \quad \lambda = [A_0, B_0, \ldots]$$

$$f(\lambda) = 1 \left\{ \underbrace{\begin{array}{c} \text{Government} \\ \text{Bid} \\ \text{Price} \\ \text{Subsidy} \\ B_0 \end{array}}_{\substack{\text{Best} \\ \text{Matching} \\ \text{Bid} \\ \text{Price}}} \text{ OR } \underbrace{\begin{array}{c} \text{Government} \\ \text{Ask} \\ \text{Price} \\ \text{Subsidy} \\ A_0 \end{array}}_{\substack{\text{Best} \\ \text{Matching} \\ \text{Ask} \\ \text{Price}}} \right\}$$

FIG. 11

METHOD AND SYSTEM FOR FACILITATING A MARKETPLACE FOR LABOR ARBITRAGE

The current application claims a priority to the U.S. Provisional Patent application Ser. No. 63/117,925 filed on Nov. 24, 2020.

FIELD OF THE INVENTION

The present invention relates generally to a field of data processing. More specifically, the present invention is a method and system for facilitating a marketplace for blockchain based labor arbitrage.

BACKGROUND OF THE INVENTION

According to the International Labor Organization (ILO), globally in 2019, there are roughly over 730 million working poor and 159 million unemployed. Most of the working poor are desperately poor and in developing countries in which young, working age populations make up more of their native population than in more developed, advanced countries. However, in Asia, particularly in southeast Asia, technology leapfrogging, as proven by more advanced Asian countries such as India, China, South Korea, and Japan, is being smartly applied by governments to lift their working poor into more equitable conditions from which to better meet growing global demand for skilled, digital labor. As governments leapfrog industries such as coal and gas, finance and banking, telecommunications, and identity management to solar, wind, and hydroelectric, decentralized finance/banking with demonetization, wireless and mobile devices, and digital identity, respectively, obstacles that come with these industries also are mitigated and, consequently, new market opportunities appear, typically making previous regulatory frameworks inapplicable. Further, digital job boards, job search aggregators, and professional social media platforms simply match demand to available skills, but pricing and payment are offline and are industry-based and not data-based. Just like for the competitors in the payment space, these competitors do not provide solutions for evolving and digitizing government labor and trade policies to enable their populations to respond to the global demand signal for digital labor. Additionally, the growing trend for government-based, cryptographic, and tokenized subsidies are not supported within these competitive solutions.

It is a sort of arbitrage on the price of labor across national economy boundaries. Although, foreign exchange markets exist today to help enable this labor arbitrage, most transactions occur amid banks, institutions, and brokerages and not between small business operators and labor. Indeed, this banking layer is another middle layer between the business operator and their need for labor, which hinders any labor cost arbitrage opportunities.

Given these rising conditions, a platform seeks to find a solution that intersects across these trends to support governments and their populations in growing their GDP (Gross Domestic Product), activating more of their unemployed, increasing standards of well-being, and generally approving future outcomes. In particular, the activity associated with the platform shall build a prototype on an intersection amongst growing demand for digital labor, decentralized banking and finance paired with demonetization, digital identity, and personal, mobile devices, such that digital labor being non-local, the markets and underlying financial transactions need to be borderless for full advantage. However, cross-border transactions are fair play disadvantaged by regulation against criminal activities, labor abuse, and basic human rights. Accordingly, a prototype of the platform shall evolve regulatory frameworks through digital rules for reciprocity within bi-lateral, uneven financial and trade policies and laws, wherein digital rules shall be implemented in publicly auditable smart contracts, key-owned by governments and serviced by solution providers, thereby making rule-by-law theory digitally enforceable with cryptographic-strength and built-in consensus.

Existing techniques for facilitating a marketplace for labor arbitrage are deficient with regard to several aspects. For instance, current technologies do not maximize exposure of their services and labor to global markets. Furthermore, current technologies do not embrace financial technologies to significantly mitigate cross-border transactions. Further, current technologies do not support unbanked laborers or service professionals. Moreover, current technologies do not cryptographically provide for accurate labor pricing on a global basis across labor and service categories.

Therefore, there is a need for improved methods and systems for facilitating a marketplace for labor arbitrage that may overcome one or more of the above-mentioned problems and/or limitations.

SUMMARY OF THE INVENTION

An innovative system and method is implemented to facilitate a marketplace for blockchain based labor arbitrage. The system providing an online platform comprises at least one processor, one communication device, at least one storage device, at least one business operator device, and a plurality of laborer devices. The processor, comprising a blockchain and at least one application programming interface (API), communicates with the at least one business operator device and the plurality of laborer devices through the communication device. All labor arbitrage transactions, data, and/or information are immutably recorded to the blockchain that may be stored in the storage device.

The method for facilitating blockchain based labor arbitrage may include receiving at least one job description associated with a job from the business operator device. After transmitting the at least one job description to the plurality of laborer devices, the method may receive at least one proposal for the job from at least one laborer device. Subsequently, the method may transmit the at least one proposal to and receive a laborer indication from the business operator device. Upon receiving a laborer preference from the business operator device, the method determines a match of a primary laborer from the plurality of laborers. The method then generates a smart contract for the job between the business operator device and the primary laborer device based on a buy order provided by the business operator device and saves the smart contract in the blockchain. Subsequently, the method acquires a deposit of a predetermined type and amount of cryptographic token for the buy order and saves the deposit in the smart contract. Upon the job completion, the method receives a job completion indication from the primary laborer device. The method processes a transaction based on the buy order and the smart contract associated with the job by generating a compensation for the transaction in response to a successful job completion, wherein all job requirements plus quality standards are satisfactorily met and signatures of both the business operator device and the primary laborer device are present in the blockchain. Therefore, the method transmits the compensation to the primary laborer device using the predetermined amount of cryptographic tokens.

In response to an unsuccessful job completion, the method provides an arbitration process, wherein an arbitration indication is sent to at least one arbitrator device associated with at least one qualified arbitrator. Based on the arbitration result, the method may require rework from the laborer device if signatures of both the arbitrator device and the business operator device are received. Otherwise, the method performs the compensation transaction and sends the compensation to the laborer device upon receiving signatures of the arbitrator device and the laborer device.

BRIEF DESCRIPTION OF THE DRAWINGS

FIG. 11 is an exemplary representation of a subsidy rule on a labor market liquidity associated with the marketplace, in accordance with some embodiments.

DETAIL DESCRIPTIONS OF THE INVENTION

All illustrations of the drawings are for the purpose of describing selected versions of the present invention and are not intended to limit the scope of the present invention.

Figure 1:
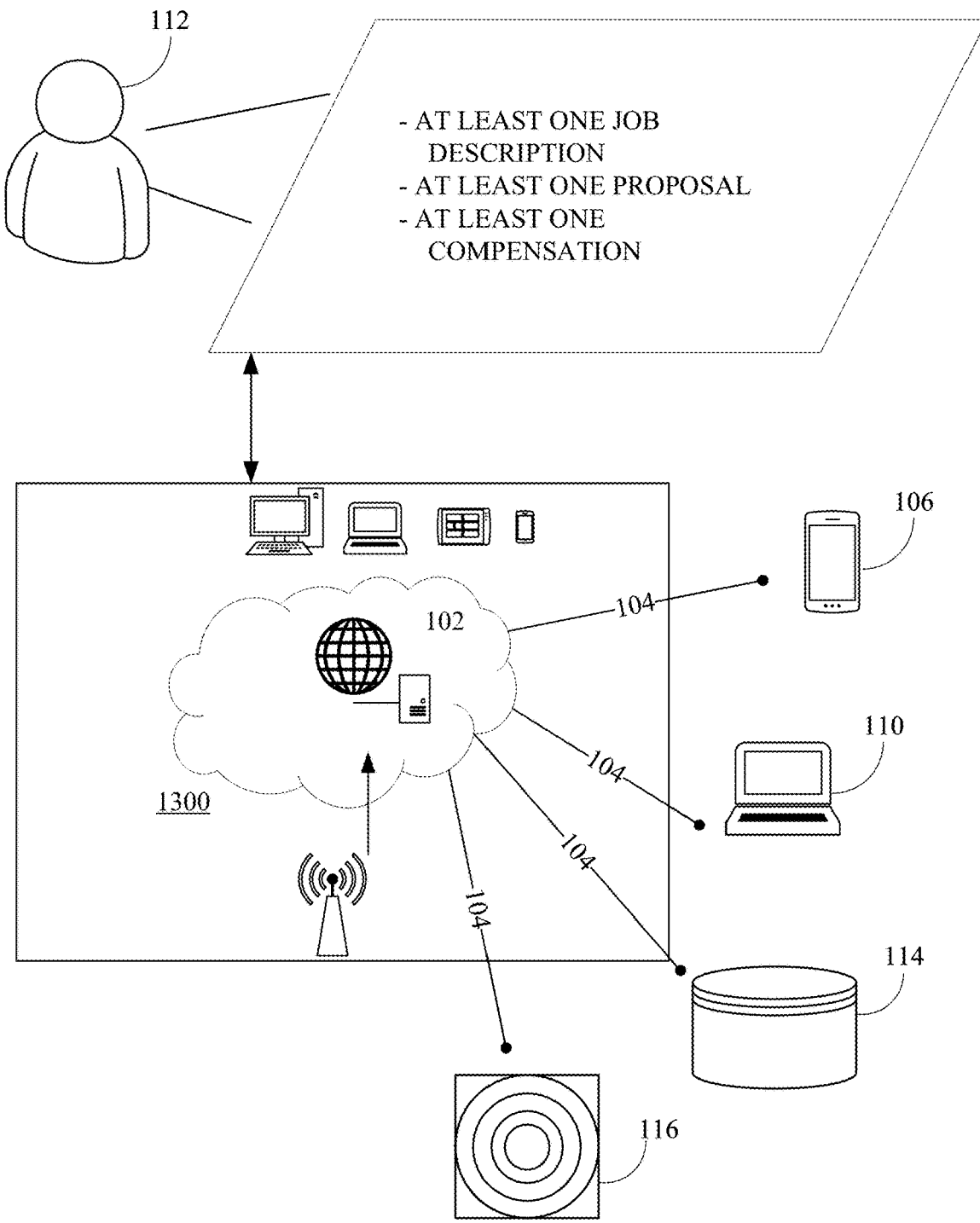
FIG. 1 is a block diagram an online platform for facilitating a marketplace for blockchain based labor arbitrage of the present invention.
Figure 10:
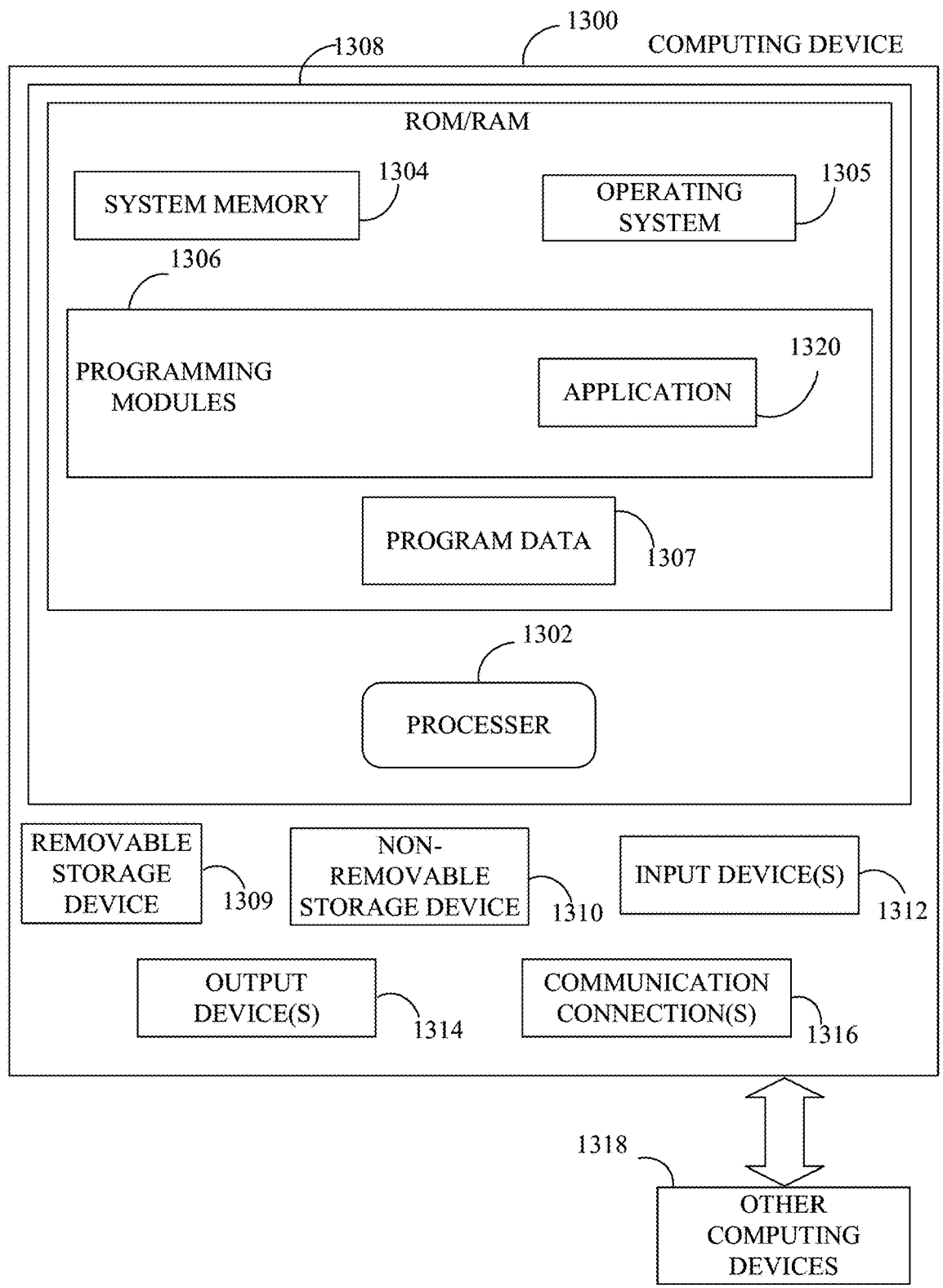
FIG. 10 is a block diagram of a computing device for implementing the method of the present invention, in accordance with some embodiments.

As can be seen in FIG. 1, an online platform 100 consistent with various embodiments of the present invention facilitates a system and method for autonomous economies based on a distributed ledger technology (DLT) may be hosted on a centralized server 102, such as, for example, a cloud computing service 1300, as can be seen in FIG. 10. The centralized server 102 may communicate with other network entities, including, but not limited to, a mobile device 106 (such as a smartphone, a laptop, a tablet computer, etc.), other electronic devices 110 (such as desktop computers, server computers, etc.), databases 114, sensors 116, and actuators (not shown) over a communication network 104, including, but not limited to, the Internet. A user 112 of the online platform 100 may include relevant parties including, but not limited to, end-user, administrator, service provider, service consumer, and so on. Accordingly, in some embodiments, electronic devices operated by the one or more relevant parties may be in communication with the online platform 100. The user 112, such as the one or more relevant parties, may access the online platform 100 through a web-based software application, application programming interface (API), or browser. The web-based software application may be embodied as, for example, but not be limited to, a website, a web application, a desktop application, and a mobile application compatible with a computing device 1300.

Figure 2:
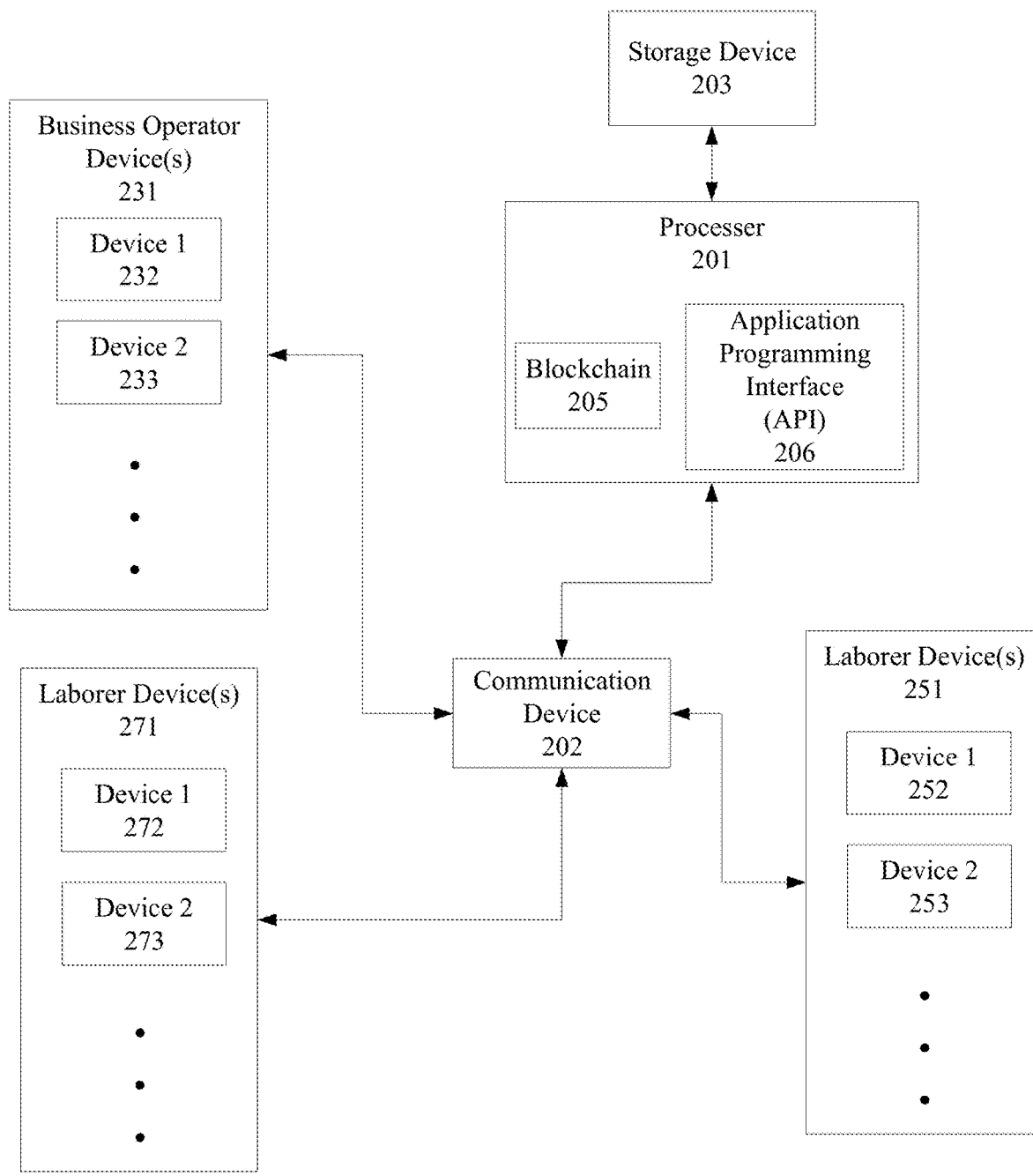
FIG. 2 is a block diagram of a system for facilitating a marketplace for blockchain based labor arbitrage of the present invention.

As can be seen in FIG. 2, an online system for facilitating a marketplace for labor arbitrage of the present invention, in accordance with some embodiments, may include a processor 201, a communication device 202, a storage device 203, at least one business operator device 231, and a plurality of laborer devices 251. The processor 201 comprises a blockchain 205 and at least one application programming interface (API) 206. The API 206 may comprise software instructions, when actuated, causing the processor 201 to perform operations, including, but not limited to, communication with the at least one business operator device 231 and the plurality of laborer devices 251 through the communication device 202, recording labor arbitrage transactions/data/information to the blockchain 205, saving all data including the blockchain 205 on the storage device 203, etc.

The communication device 202 may be communicatively coupled with the processor 201 and may be configured for receiving at least one job description associated with at least one job from the at least one business operator device 231. The at least one business operator device 231 may be associated with at least one business operator. The at least one job may include at least one of products and services required by the at least one business operator device 231, and may include, but is not limited to, a job description associated with the at least one job. The job description may include, but is not limited to, a job title, a job purpose, the at least one of the products and the services, a scope of work, a job requirement, or any combination thereof etc. Additionally, the job description may be associated with the at least one of the products and the services required by the at least one business operator device 231. The at least one business operator device 231 may include devices such as, but is not limited to, smartphones, laptops, PCs, etc. The communication device 202 may be configured for transmitting the at least one job description to the plurality of laborer devices 251 associated with the plurality of laborers. The plurality of laborer devices 251 may include devices such as, but is not limited to, smartphones, laptops, PCs, etc. The communication device 202 may be configured for receiving at least one proposal for the at least one job from at least one laborer device of the plurality of laborer devices 251. The at least one proposal may include at least one of a willingness of accepting the job, at least one term, and at least one condition, wherein the at least one condition may include, but is not limited to, a compensation/salary requirement, a benefit requirement, and a working environment requirement, etc. The communication device 202 may be configured for transmitting the at least one proposal to the at least one business operator device 231. Additionally, the communication device 202 may be configured for receiving at least one laborer indication from the at least one business operator device 231. Further, the communication device 202 may be configured for receiving, at least one job completion indication associated with the at least one job from the at least one primary laborer device 251. More specifically, the at least one job completion indication may include an indication that conveys to the at least one business operator device 231 about the completion of the at least one job by the at least one primary laborer device 251. The communication device 202 may be configured for receiving at least one buy order associated with the at least one job from the at least one business operator device 231. The communication device 202 may be configured for transmitting the at least one compensation to the at least one primary laborer device 251.

As can be seen in FIG. 2, the processor 201 comprises the blockchain 205 and the at least one application programming interface (API) 206. The blockchain 205 is created to immutably record every transaction, event, data, etc., into blocks. The blockchain 205 may be saved in the storage device 203 coupled with the processor 201. The blockchain 205 is distributed on the platform of the present invention thus providing access to every computing device 1300 of the platform. The API 206 comprises software instructions that cause the processor 201 to perform operations of the method of the present invention. Specifically, the processor 201 may be configured for identifying at least one primary laborer device 251 of at least one laborer from the plurality of laborer device 251 based on the at least one laborer indication. Once the primary laborer device 251 is identified, the method may include selecting the at least one primary laborer device 251 of the at least one laborer. Additionally, the processor 201 may be configured for generating at least one smart contract of the job between the at least one business operator device 231 and the primary laborer device 251 based on the identification and selection of the primary laborer device 251. Further, the processor 201 may be configured for processing at least one transaction based on the at least one buy order and the smart contract associated with the job after receiving of the at least one buy order. The at least one transaction may be facilitated by the API 206 using the blockchain 205 associated with the platform, wherein the API 206 may be a mobile application, or mobile API 206. The mobile API 206 may be available for both the at least one primary laborer device 251 and the at least one business operator device 231. The mobile API 206 may facilitate creating a business operator account associated with the at least one business operator device 231 and a primary laborer account associated with the at least one primary laborer device 251. Additionally, the mobile API 206 may facilitate managing, viewing, and/or submitting the at least one transaction. In some embodiments of the present invention, the at least one transaction may be stored in the storage device 203, or a server (such as, a backend server) such that storing may be based on transmitting of data associated with the at least one transaction through the communication device 202 using a communication network (such as, the Internet). The storing, in an instance, may allow accessing the at least one transaction publicly for a plurality of use cases associated with, in an instance, but not limited to, public labor markets, compliance, dispute arbitration, governance, price discovery, etc. Further, the processor 201 may be configured for generating at least one compensation associated with the at least one transaction for the job. The at least one compensation may include at least one digital cryptographic token. The at least one cryptographic token may correspond to a plurality of laborer tokens associated with the plurality of laborer devices 251. Additionally, the at least one cryptographic token may include at least one piece of cryptographic information associated with the at least one transaction. The at least one cryptographic token may be created using the business operator device 231. The mobile API 206 may facilitate the creating, and/or management of the at least one cryptographic token. The at least one piece of cryptographic information may include, but is not limited to, description, supply, ownership, native blockchain, multi-signature attributes, constraints, etc.

The storage device 203 may be communicatively coupled with the processor 201. Additionally, the storage device 203 may be configured for storing the at least one smart contract in the blockchain.

Figure 3:
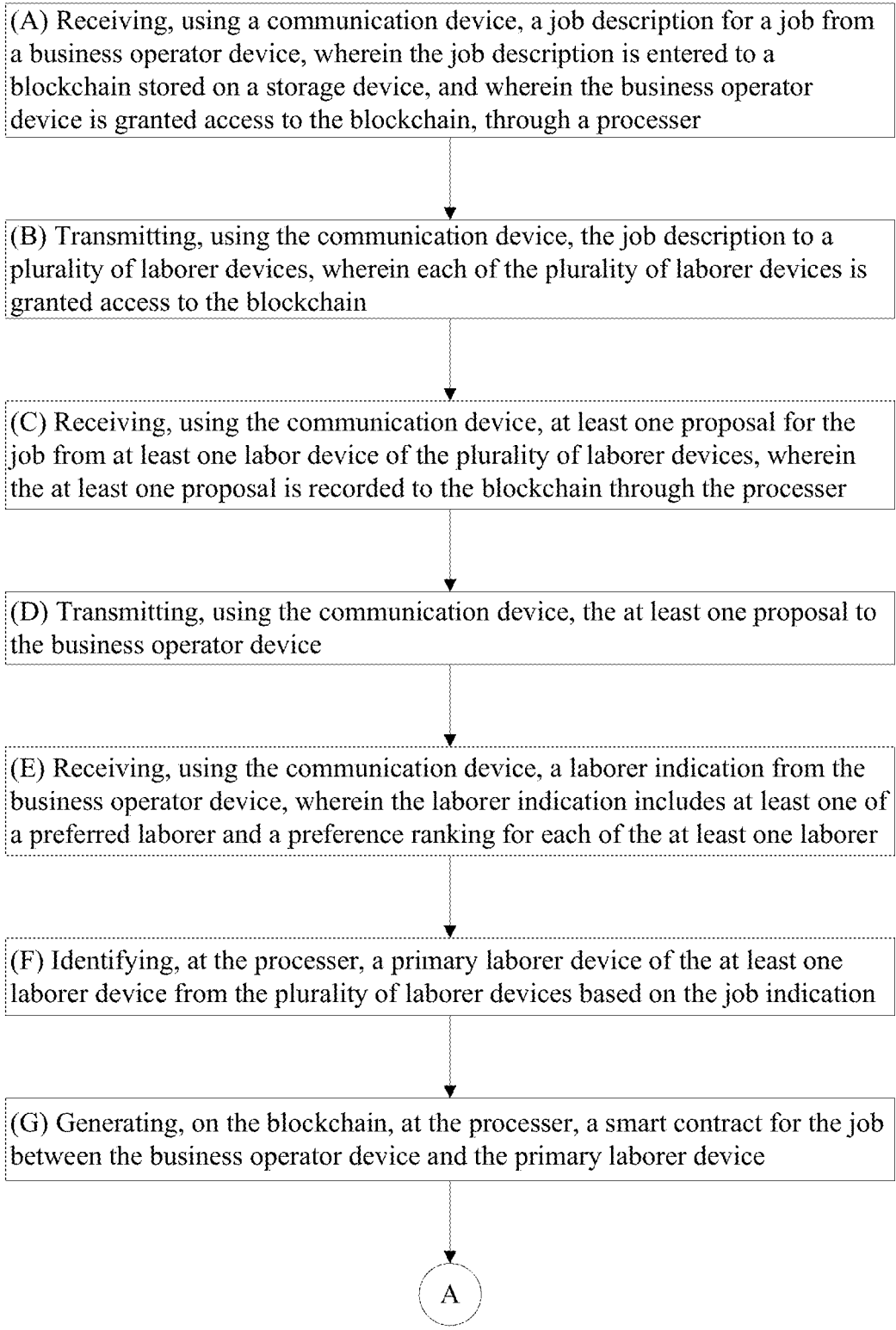
FIG. 3 is a flowchart of a method for facilitating a marketplace for labor arbitrage of the present invention, in accordance with some embodiments.

As can be seen in FIG. 3, the method for facilitating a blockchain based marketplace for labor arbitrage of the present invention includes a step of receiving, using a communication device 202, a job description for a job from a business operator device 231, wherein the job description is entered to a blockchain 205 stored on a storage device 203, and wherein the business operator device 231 is granted access to the blockchain 205, through a processor 201 (Step A). The job may include at least one of the products and services required by the at least one business operator device 231. Additionally, the job may include at least one job funded by a government fund, wherein the government fund includes at least one of an unemployment relief fund, an unemployment insurance fund, an unemployment benefit fund, and a government subsidy. The at least one business operator device 231 may be associated with at least one business operator. Additionally, the at least one business operator device 231 may include at least one government operator device and may include devices such as, but are not limited to, smartphones, laptops, PCs, etc. The at least one job description may include, but is not limited to, a job title, a job purpose, a product or service, a scope of work, and a job requirement, etc.

Subsequently, as can be seen in FIG. 3, the method may include a step of transmitting, using the communication device 202, the job description to a plurality of laborer devices 251, wherein each of the plurality of laborer devices 251 is granted access to the blockchain 205 (Step B). The plurality of laborer devices 251 may include devices such as, but is not limited to, smartphones, laptops, PCs, etc. Additionally, the plurality of laborer devices 251 includes a plurality of unemployed laborer devices. Next, the method may include a step of receiving, using the communication device 202, at least one proposal for the job from at least one labor device of the plurality of laborer devices 251, and recording the at least one proposal to the blockchain 205 through the processor 201 (Step C). The at least one proposal may include at least one of a willingness of accepting the job, at least one term, and at least one condition. Additionally, the at least one condition includes one of a compensation/salary requirement, a benefit requirement, and a working environment requirement, etc.

Subsequently, as can be seen in FIG. 3, the method may include a step of transmitting, using the communication device 202, the at least one proposal to the business operator device 231 (Step D). Next, the method may include a step of receiving, using the communication device 202, a laborer indication from the business operator device 231, wherein the laborer indication includes at least one of a preferred laborer and a preference ranking for each of the at least one laborer (Step E).

With the laborer indication, as can be seen in FIG. 3, the method may include a step of identifying, at the processor 201, a primary laborer device of the at least one laborer device from the plurality of laborer devices 251 based on the job indication (Step F). In this step, the method may include selecting the at least one primary laborer of the at least one laborer. The method matches a qualified and willing primary laborer to a job requirement based on the business operator's preference and any relevant quality requirement. The entire record stored on the blockchain for the primary laborer is reviewed and verified in this process before a match is determined. Once a match is found, the method may include a step of generating, on the blockchain 205, at the processor 201, a smart contract for the job between the business operator device 231 and the primary laborer device 251 (Step G).

Figure 4:
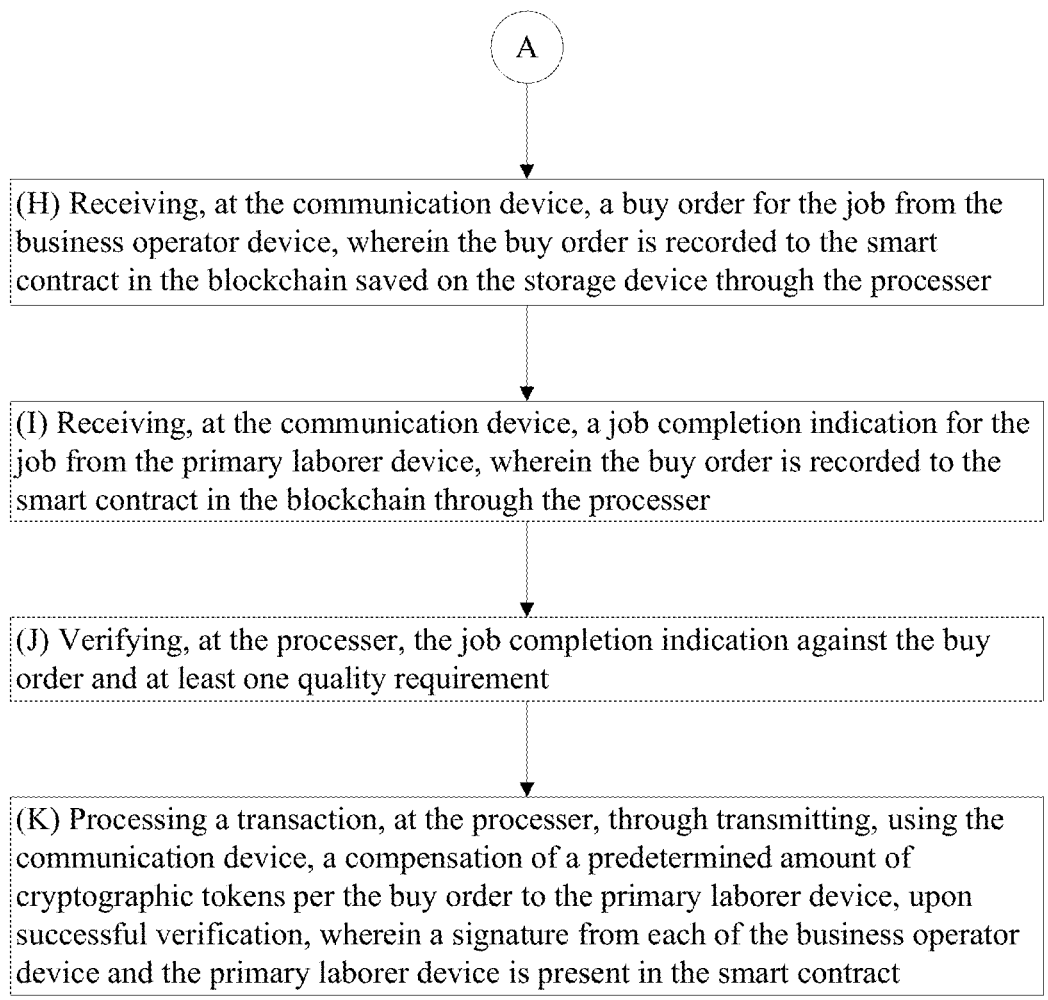
FIG. 4 is a continuation flowchart corresponding to the flowchart of FIG. 3, in accordance with some embodiments.

With the smart contract, as can be seen in FIG. 4, the method may include a step of receiving, at the communication device 202, a buy order for the job from the business operator device 231, wherein the buy order is recorded to the smart contract in the blockchain 205 saved on the storage device 203 through the processor 201 (Step H). The buy order may include, but is not limited to, a predetermined type of cryptographic token that is acceptable to the primary laborer device 251, a predetermined amount of cryptographic tokens, confirmation and/or agreement of the smart contract for the job, acceptance of the primary laborer, etc.

Once the job is completed, as can be seen in FIG. 4, the method may include a step of receiving, at the communication device 202, a job completion indication for the job from the primary laborer device 251, wherein the buy order is recorded to the smart contract in the blockchain 205 through the processor 201 (Step I). The job completion indication may include an indication that may convey to the at least one business operator device 231 about the completion of the job by the primary laborer device 251. Additionally, the job completion indication may include, but is not limited to, at least one deliverable, comments, communications, etc.

Subsequently, as can be seen in FIG. 4, the method may include a step of verifying, at the processor 202, the job completion indication against the buy order and at least one quality requirement (Step J). The method reviews the job completion indication against the buy order associated with the smart contract, at least one quality requirement to determine if the job completion is satisfactory to all requirements of the business operator device 251.

Upon successful verification, as can be seen in FIG. 4, the method may include a step of processing a transaction, at the processor 201, through transmitting, using the communication device 202, a compensation of a predetermined amount of cryptographic tokens per the buy order to the primary laborer device 251, wherein a signature from each of the business operator device 231 and the primary laborer device 251 is present in the smart contract (Step K). Specifically, the verification of the job completion indication can be validated with digital signatures from both the business operator device 231 and the primary laborer device 251. Additionally, the verification of the job completion indication includes an evaluation of quality requirements for the job completion indication. The smart contract is configured to require at least two digital signatures from the business operator device 231, the primary laborer device 241, and an arbitrator device 271 to release a predetermined amount of cryptographic tokens for the job to the primary laborer device 251. Further, the smart contract may include at least one of a plurality of requirements for the job, a plurality of requirements for periods of job performance and rework, and at least one requirement for job completion quality. The transaction may be stored the storage device 203, or in a server (such as, a backend server) such that storing may be based on transmitting of data associated with the transaction through the communication device 202 over a communication link using a communication network (such as, the Internet). The storing may allow accessing the transaction publicly for a plurality of use cases associated with, public labor markets, compliance, dispute arbitration, governance, price discovery, etc. The transaction may include at least one of purchasing and selling of the at least one cryptographic token. The at least one cryptographic token may correspond to a plurality of laborer tokens associated with the plurality of laborer device 251. The at least one cryptographic token may be a digital token that may include at least one cryptographic information associated with the transaction. The at least one digital token may be created using the business operator device 231. The mobile API 206 may facilitate the creation, and/or management of the at least one cryptographic token. The at least one cryptographic information may include, but is not limited to, description, supply, ownership, native blockchain, multi-signature attributes, constraints, etc.

Figure 5:
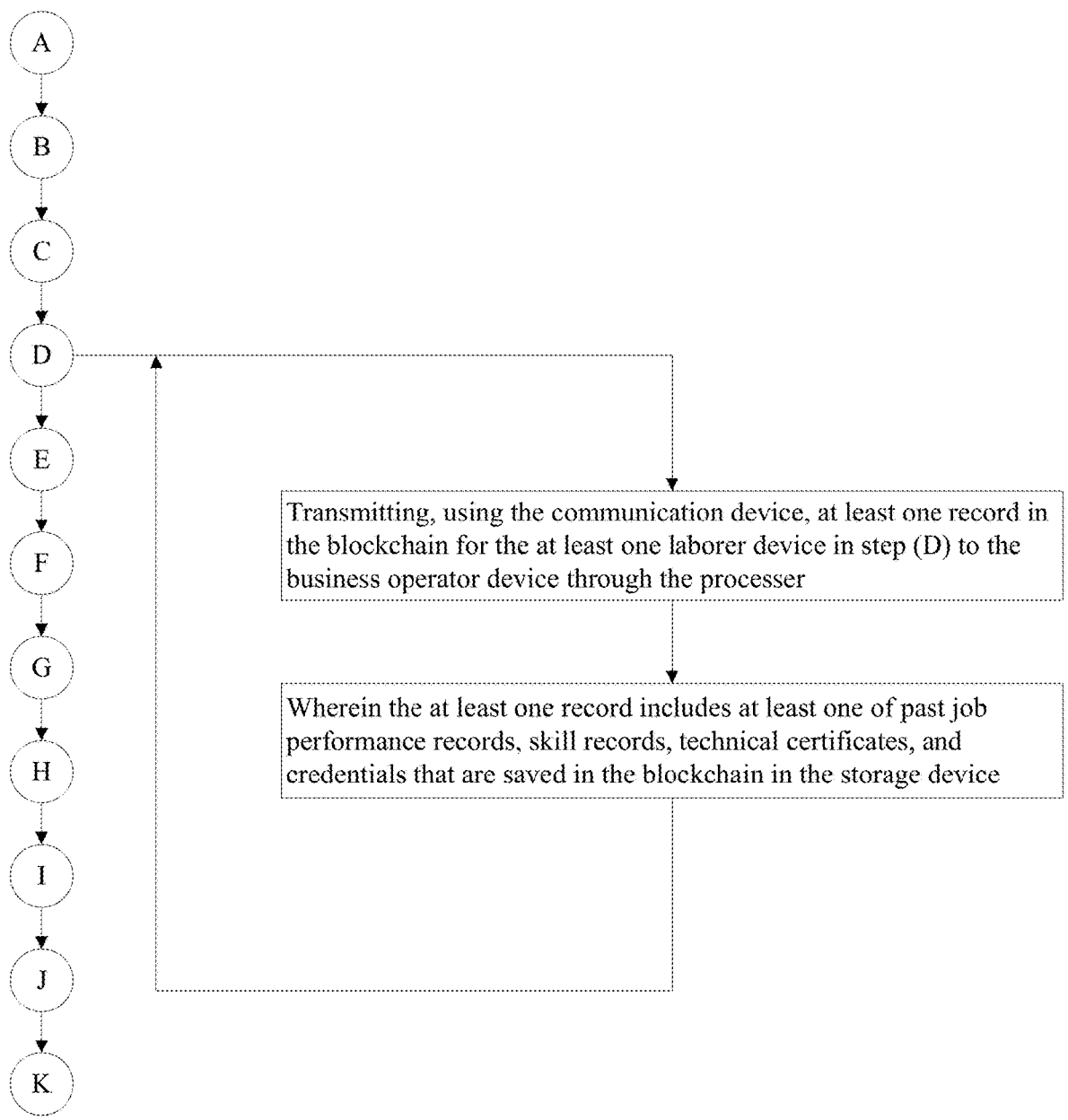
FIG. 5 is a flowchart of an alternative embodiment of the method of the present invention, wherein at least one record in the blockchain is provided to at least one laborer device.

As can be seen in FIG. 5, the method may comprise a sub-process for providing at least one record for the at least one laborer device 251 that provides a job proposal for the job requested by the business operator device 231. More specifically, the method includes a step of transmitting, using the communication device, at least one record in the blockchain 205 for the at least one laborer device 251 in Step D to the business operator device 231 through the processor; wherein the at least one record includes at least one of past job performance records, skill records, technical certificates, and credentials that are saved in the blockchain 205 in the storage device 203. Additionally, the at least one record may include, but is not limited to, at least one on-chain metadata in blockchain 205 for the at least one laborer device 251.

Figure 6:
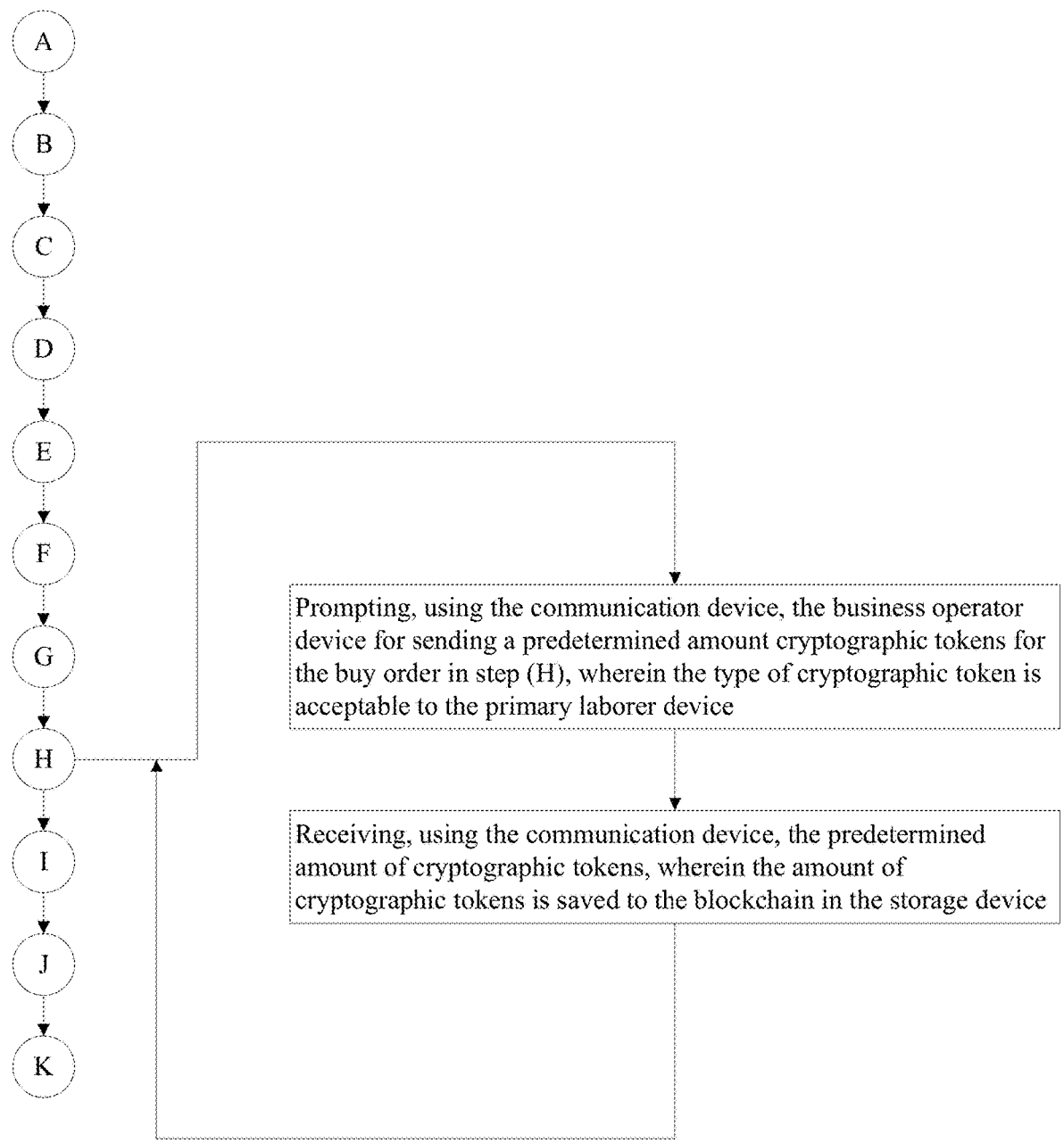
FIG. 6 is a flowchart of another embodiment of the method of the present invention, wherein a predetermined amount of cryptographic tokens is deposited into a buy order issued by a business operator device.

As can be seen in FIG. 6, the method may comprise a sub-process for facilitating a deposit of the predetermined amount of cryptographic tokens for the buy order from the business operator device 231. More specifically, the method may include a step of prompting, using the communication device 202, the business operator device 231 for sending a predetermined amount cryptographic tokens for the buy order in Step H, wherein the type of cryptographic token is acceptable to the primary laborer device 251. Additionally, the method includes a step of receiving, using the communication device 202, the predetermined amount of cryptographic tokens, wherein the amount of cryptographic tokens is saved to the blockchain 205 in the storage device 203.

Figure 7:
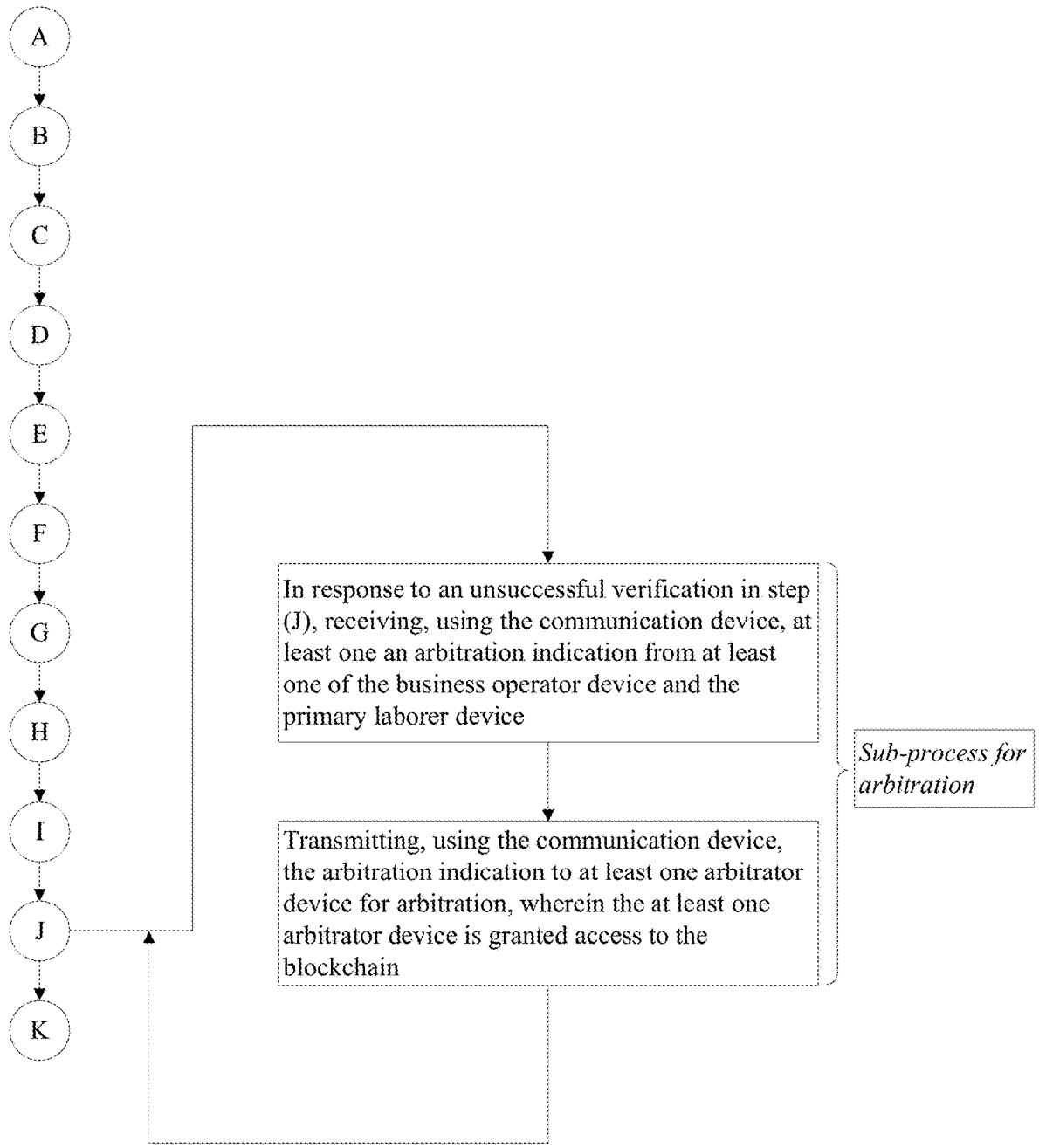
FIG. 7 is a flowchart of a sub-process of the method of the present invention, wherein an arbitration is provided to resolve any dispute during a laborer arbitrage.
Figure 8:
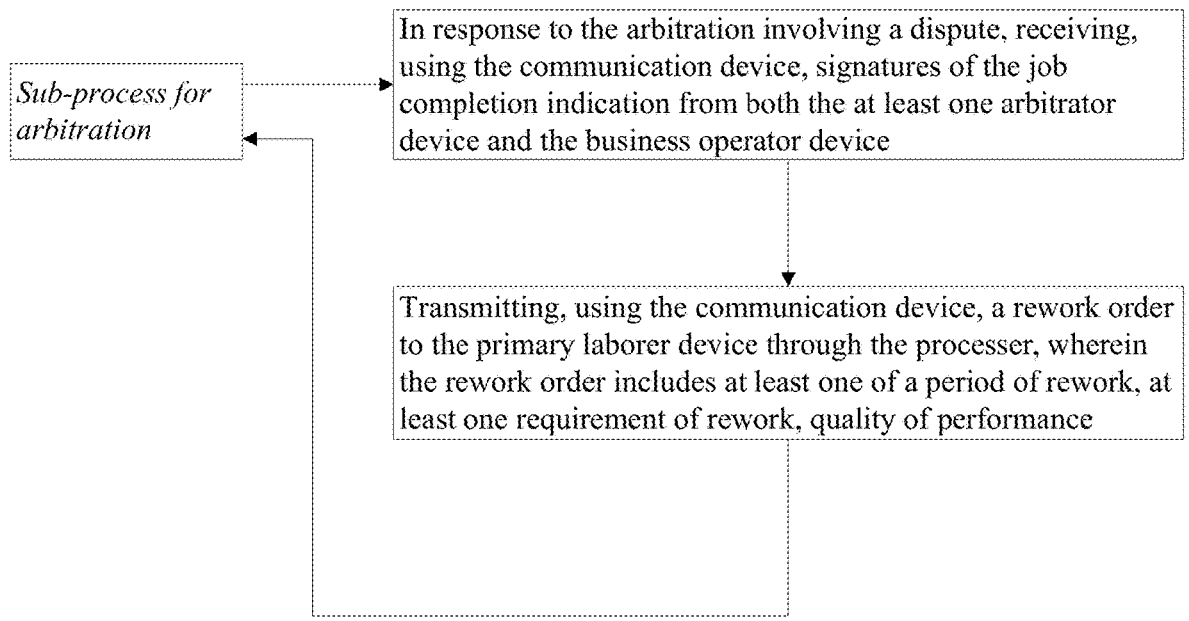
FIG. 8 is a flowchart of an alternative embodiment of the sub-process for arbitration of the method of the present invention, wherein a rework order is generated and transmitted to the laborer device.
Figure 9:
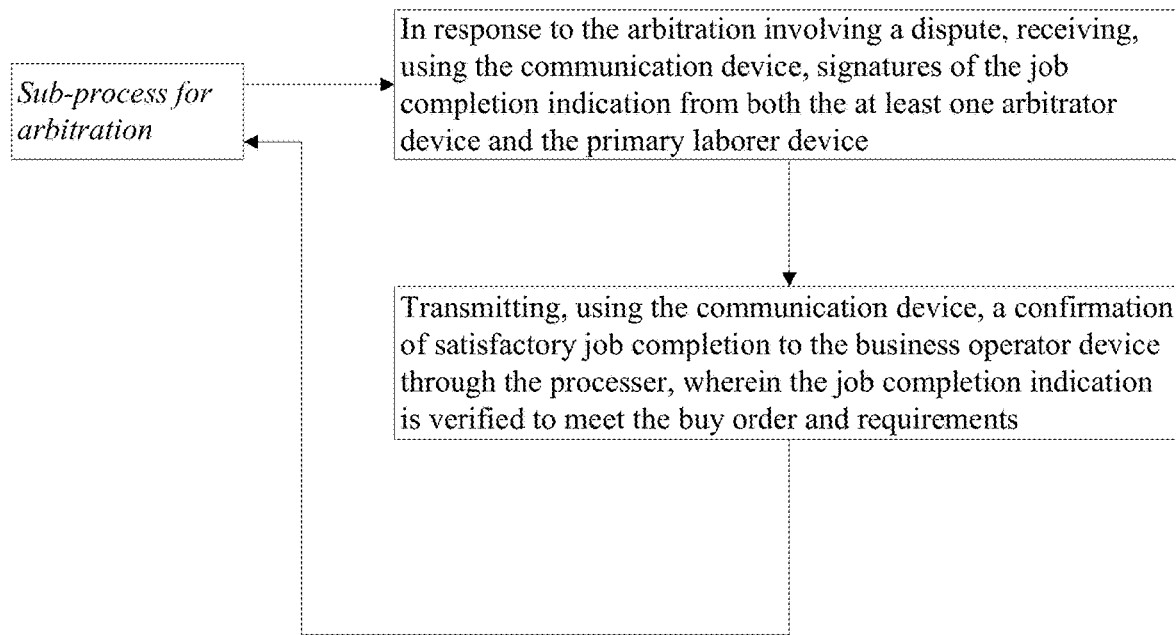
FIG. 9 is a flowchart of another embodiment of the sub-process for arbitration of the method of the present invention, wherein a compensation is transmitted to the laborer device.

As can be seen in FIG. 7, the method may comprise a sub-process for facilitating an arbitration. More specifically, the method may include a step of receiving, using the communication device 202, at least one an arbitration indication from at least one of the business operator device 231 and the primary laborer device 251, in response to an unsuccessful verification in Step J. Subsequently, the method includes a step of transmitting, using the communication device 202, the arbitration indication to at least one arbitrator device 271 for arbitration, wherein the at least one arbitrator device 271 is granted access to the blockchain 205. The at least one arbitrator device 271 is associated with at least one arbitrator who may be a representative of an authority that may settle one or more disputes associated with the transaction. As can be seen in FIG. 8, in some embodiments of the present invention, the method may include a step of receiving, using the communication device 202, signatures of the job completion indication from both the at least one arbitrator device 271 and the business operator device 231, in response to the arbitration involving a dispute. Subsequently, the method includes a step of transmitting, using the communication device 202, a rework order to the primary laborer device 251 through the processor 201, wherein the rework order includes at least one of a period of rework, at least one requirement of rework, quality of performance, etc. As can be seen in FIG. 9, in other embodiments of the present invention, the method may include a step of receiving, using the communication device 202, signatures of the job completion indication from both the at least one arbitrator device 271 and the primary laborer device 251, in response to the arbitration involving a dispute. Subsequently, the method includes a step of transmitting, using the communication device 202, a confirmation of satisfactory job completion to the business operator device 251 through the processor 201, wherein the job completion indication is verified to meet the buy order and requirements.

As can be seen in FIG. 10, a system consistent with the embodiments of the present invention may include a computing device or a cloud service, such as the computing device 1300. In a basic configuration, the computing device 1300 may include at least one processor 1302 (201) and a system memory 1304. Depending on the configuration and type of the computing device 1300, a system memory 1304 may comprise, but is not limited to, volatile (e.g. random-access memory (RAM)), non-volatile (e.g. read-only memory (ROM)), flash memory, or any combination. System memory 1304 may include operating system 1305, one or more programming modules 1306, and may include a program data 1307. Operating system 1305, for example, may be suitable for controlling computing device 1300's operation. In one embodiment, programming modules 1306 may include image-processing module, machine learning module and/or image classifying module. Furthermore, embodiments of the disclosure may be practiced in conjunction with a graphics library, other operating systems, or any other application program and is not limited to any particular application or system. This basic configuration as can be seen in FIG. 10 by those components within a dashed line 1308.

The computing device 1300 may have additional features or functionality. For example, the computing device 1300 may include additional data storage devices 203 (removable and/or non-removable) such as, for example, magnetic disks, optical disks, or tape. Such additional storage is illustrated in FIG. 10 by a removable storage 1309 and a non-removable storage 1310. Computer storage media may include volatile and nonvolatile, removable and non-removable media implemented in any method or technology for storage of information, such as computer-readable instructions, data structures, program modules, or other data. System memory 1304, removable storage 1309, and non-removable storage 1310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 1300. Computing device 1300 may also have input device(s) 1312 such as a keyboard, a mouse, a pen, a sound input device, a touch input device, a location sensor, a camera, a biometric sensor, etc. Output device(s) 1314 such as a display, speakers, a printer, etc. may also be included. The aforementioned devices are examples and others may be used.

The computing device 1300 may also contain a communication connection 1316 that may allow device 1300 to communicate with other computing devices 1318, such as over a network in a distributed computing environment, for example, an intranet or the Internet. Communication connection 1316 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1304, including operating system 1305. While executing on processing unit 1302, programming modules 1306 (e.g., application 1320 such as a media player) may perform processes including, for example, one or more stages of methods, algorithms, systems, applications, servers, databases as described above. The aforementioned process is an example, and processing unit 1302 may perform other processes. Other programming modules that may be used in accordance with embodiments of the present disclosure may include sound encoding/decoding applications, machine learning application, acoustic classifiers, etc.

Generally, consistent with embodiments of the present invention, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multi-processor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the present invention may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the present invention, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the present invention have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Overview:

The present invention provides a marketplace for labor arbitrage. The marketplace for labor arbitrage is a technical innovation that aims to tackle growing wealth inequality and eventually enables the global labor supply, especially labor that can be completed remotely and digitally, to compete in local markets. Additionally, the present invention aims to build a global platform that is open for all operators, regardless of size, to contract for labor across the world and within a digital currency market for exchange and labor price discovery in preparation to service a growing number of business operators who provide digital products and services such as in content, gaming, and social media. The labor behind these products and services are increasingly non-local and even anonymous. Thus, to be competitive, the business operators must find the most efficient labor with the lowest costs to meet their requirements. The present invention facilitates the supply of the most qualified and inexpensive labor through the digital currency exchange for the global labor market. As operators develop an economy using digital currencies through Blockchain, cryptographic tokens, labor markets can be priced, across exchanges, on the basis of an operator's digital economy, allowing for true value to value exchange without adding any non-related costs from the exchange between native fiat currencies as such non-related costs stem from traditional foreign exchange (FOREX), government malpractice of fiscal policy, and relative differences across national economies.

A distinctive benefit for the skilled laborer using the present invention is the increased flexibility in compensation, in both offering a competitive rate and in being compensated from an operator buying labor tokens by placing a funded buy order on a platform. The present invention allows the operator to agree to place a funded buy order, with no conditions, upon completion of a job by a laborer. The platform of the prevent invention is also able to support meeting required conditions for completing a transaction by a multi-signature cryptographic token, in which two out of three digital signatures are required. The three digital signatures are (1) the business operator; (2) the laborer; and, (3) the platform or an arbitrator. On arbitration, the platform can determine if the negotiated labor produced per an agreement between the business operator and the laborer and, subsequently, digitally signs to release tokens to the laborer.

Amid the complications of regulatory compliance associated with payroll, taxes, and employee benefits, the value of using the present invention is substantial for the laborer and for the work performed. The platform aims to provide for derivative value as an open and funded buy wall but not yet fulfilled. For example, a funded buy wall can serve as means to pay for goods or services, in which case the laborer would send, as payment, laborer tokens to the provider, for the provider to fulfill a portion of the open and funded buy wall for that laborer token.

As the use cases disclosed herein scale, the platform facilitates labor arbitrage opportunities creating new supply chains and migrating current roles from a fiat-based compensation model to a token-based compensation model, and the new supply chains will have fewer middle layers, less boundaries, which in turn provide for more wealth to labor, especially labor from poorer economies than existing platforms.

Additionally, the present invention delivers both a design and prototype of the platform disclosed. The design details the mechanisms that enable the global marketplace for labor arbitrage: (1) token smart contract features such as multi-signature; (2) token creation and management for business operators and laborers; (3) mapping of regulatory requirements to auditing APIs (Application Programming Interfaces), platform controls, and token metadata; (4) bind token creation to employee benefits redemption such as medical, retirement, etc.; (5) labor token exchange for labor compensation and derivative value use cases; (6) dispute resolution and governance controls for final settlement; and, (7) integration plan for blockchain interoperability. The prototype provides a mobile application that allows for account creation and management, views, and for submitting transactions. Blockchain transactions which involve transfers of tokens shall require a backend server application programming interface (or backend server API) that connects to the applicable blockchains to make those transactions publicly available for use cases around public labor markets, compliance, dispute arbitration and governance, and price discovery.

The present invention describes a major use case for account creation and management that provides support for two major account types, business operator and laborer or professional services. The account creation allows for major features such as token creation and management, including details such as description, supply, ownership, native blockchain, multi-signature attributes, and constraints. These details require the creation of a smart contract across the initial Blockchain networks that are supported by Ethereum and EOS (Entrepreneurial Operating System).

The present invention describes a major use case for labor or professional service compensation that shall provide support for views of a laborer's ALPHA token in an ALPHA/BETA token exchange market, so that a laborer can confirm that an employer funded a buy order using the employer's token BETA. The prototype disclosed also supports other token exchange markets for ALPHA, such as for Bitcoin, Ether, or EOS in order to provide more flexibility in compensating a laborer or professional service, especially if a business operator chose not to create their own token. There are multiple views of these markets to support a simple exchange use case (i.e., platform provided exchange rate for immediate liquidity) or to support a larger set of derivative value use cases (i.e., traditional trading views).

Given the recent national issue with abusive community policing, the prototype shall support a use case in which municipalities can compensate police officers directly and indirectly from their citizens. For example, under token constraints, a municipality can provide incentives for performance by specifying a rule that accounts for 10 citizen tokens to one municipality token which goes to an end-of-year performance bonus, so a municipality can issue citizen tokens by the amount of property taxes paid, which are used to distribute to known, community police officers by each citizen, providing incentives for police officers to know the citizens personally which is a significant factor in preventing abuse.

The present invention aims to maximize value of digital labor across national economic boundaries, minimize labor costs for local business operators, and enable market arbitrage within global labor markets to bring down global wealth inequality. Further, the present invention describes the platform that may be implemented over the internet, through Blockchain smart contracts, and with governed, multi-signature token transactions. Further, the platform enclosed in the disclosure aims to include digital labor markets, spot exchange between labor token and fiat value, derivative value, international trade insofar as labor, and normalization of labor standards, certifications, and qualifications. Further, the platform disclosed may empower labor for increasing labor value by leveraging global markets but still offer competitive labor costs to local business operators. Local business operators do not have cost advantages provided by economy of scale enjoyed by global business operators; however, a technical solution to the thing mentioned thereof would require the prototype as the platform disclosed on which the scale would be available to all participating operators within a specific industry. Some challenges for the prototype to meet shall be to engage and provide working incentives for global labor and operators and make liquid labor token value to governed fiat money markets, which requires compliance to international banking regulation and taxation, guidance from FOREX markets, customer protections, and criminal activity mitigations. This activity shall implement a plan to meet these challenges through the discovery of smart contract and platform parameters that drive high level of engagement to subscription by labor and business operator. These parameters and the mechanisms that behave off these parameters shall be (1) publicly available and auditable on Blockchains from smart contract transactions and provide the required transparency for high engagement and compliance; (2) provide for the aggregation of the demand and supply sides of global labor; and (3) provide for normalization functions that perform equivalence across national boundaries for any particular industry standard, qualification, and certification. The local business operators, in aggregate, pose a larger demand for labor than global business operators, in aggregate. To that extent, global commerce can be further extended, which would further reduce global wealth inequality and better distribute and align resources to global initiatives. This activity prototype shall provide for documented results that prove sustainment and provide for scaling properties which predict the amount of increase to global commerce and trade at scale. Another predicted impact would be to the normalization of labor across national boundaries, which would include governmental pressure to set equivalence to labor protections, qualifications, standards, and certifications on the basis of the increase of international trade by the size increase in labor markets, targeting digital and global labor markets, especially for skilled labor around the production of digital content, products, and services. Global demand for this is undeniably a growing trend, yet national boundaries and native fiat currencies and their exchange markets, i.e., FOREX, unnecessarily weigh down labor's attempt to grow beyond national boundaries and find global demand. The prototype shall introduce lift on these weights that drag on free market forces of supply and demand and, to that extent, allow for unconstrained growth of these labor markets, in particular, growth that is invariant across boundaries, currencies, and politics. Under these market-friendly conditions, skilled labor and business operators can discover the naked price of labor between them without considering costs for international banking and currency exchange, especially for border-crossing transactions.

For skilled laborers, the prototype provides a global market in which the skilled laborers can better find matching demand than locally and establish a wider buy-side spectrum. Any particular buyer-side spectrum reflects better true value than an industry-based frequency distribution, since the market can place the smaller buy-side spectrum within the industry-based frequency distribution, leading to a realization that the traditional perspective on uniform labor cost, regardless of the labor type within an industry type, is not reflective of true value and so not fair. Generally, traditional perspectives allow for value differentiation based on experience rather than the type of labor with any industry type, however, still a rough approximation of labor value. Even better yet are traditional methods based on merit such as for labor behind sales volume. In light of all this, the prototype shall go further and bind metadata of digital products with its corresponding slice of the buy-side spectrum, so that price discovery can be determined in-platform, with native platform data, beyond just sales volume, experience, and category.

The prototype reaches for an innovation that empowers quality labor to extend into demand markets that are from larger economic scale than from the home economy of that labor. This empowerment shall allow for any large displacement of national economies to naturally come together by market forces, which, as a side-effect, brings down global inequality, thereby increasing the size of the global economy. This extension into global demand markets shall be compliant of local and international regulatory frameworks, for labor rights, consumer and investor protections, taxation, and international banking and finance. Underpinning this confidence is the transparency, availability, immutability, and flexibility of having a global and public distributed data framework, grounded in Blockchain, with platform-based governance that is of the abovementioned compliance and implemented as a set of smart contracts.

The prototype targeted market starts with the globally unemployed and desperately poor as it increases their potential to earn living wages and participate in future-proof, digital labor markets, but ends as a derivative benefit to their governments by increasing their GDP, lowering activation costs, providing digital, policy-based incentives, and better positioning their working populations to compete globally.

Competitors in such a space may realize the enabling power of decentralized and automated frameworks for populations and, consequently, the governments, such as Alibaba®. Alibaba® has been characterized as an economy by Jack Ma as it seeks to break down barriers for cross-border transactions with main sponsorship and support of the Electronic World Trade Platform (EWTP). As Alibaba® brings convergence to global supply-side lines, regardless of borders, by using a platform for a global market of suppliers, buyers, and distributers, and looking at trade finance as an opportunity ripe for applied fintech, which naturally extends into labor.

Direct competitors in the payment space include, but not limited to, Crosspay®, GoPay®, BitPay®, Ripple®, Brave®, and PayID®. However, the direct competitors mentioned thereof are either regional or national focused or are payment focused and not concerned over labor markets. Certainly, one or more of these competitors are probably better situated as stakeholders and partners within solutions providing for an ecosystem of digital, globalized labor markets and governance. Further, none provide a method by which normalized, smart contracts are produced for governments and business operators to satisfy national and international labor compliance and bi-lateral reciprocity, respectively.

The prototype seeks to prove the innovative features to scale commercial success of the platform disclosed to global size. To reach global scale, finding normalization methods across uneven trade, labor, and financial regulation polices and GDP (Gross Domestic Product) across national boundaries is a keystone. Effective normalization shall allow for government token subsidies to offset differences of same labor cost between countries, which shall allow for richer countries to cost effectively fulfill labor demand from global supply, especially from poorer countries by managing and governing liquidity in cross-border labor markets. For example, the objective liquidity function shall employ constraints (i.e., based on labor programs and trade policies) to limit subsidizing the best asks and bids to increase and activate employment, as well as GDP and trade. The integration of such objective function shall determine the level of funding, by a government, into its labor subsidy token, over any specified period. The prototype shall allow for poorer countries to map their trade and labor rules to the parameterized objective liquidity function to do real-time, day-to-day tuning of their trade and labor goals and benchmarks. Over time, the prototype shall build, on recursive deep-learning, many bi-lateral normalization parameters between government pairs, which shall converge, over time, to a global line, due to market arbitrage forces and effective application of government token subsidies. The commercialization strategy starts with competing for government contracts that seek to find better activation rates for local, state, and federal governments on unemployment insurance/program disbursements across countries that tax employers to fund labor activation. In the United States (US) alone, in fiscal year 2020, $2,243,649,000 USD was collected and then disbursed to state unemployment programs; however, activation rates are based mostly on US demand, instead of global demand. Further, wage levels are not proportionately subsidized to labor skill and type, labor laws, and trade. Although traditional activation methods can bring labor, without Blockchain, into global markets and employ wage subsidy policies, it needs to do so with these legacy constraints (1) finance and banking, (2) foreign exchange markets, (3) unaccountable international labor law and human rights compliance, and (4) no special focus on growing digital labor markets. To the extent of success of the prototype platform against such government contracts, seeding of a labor subscription base starts with the accounts mostly in need for higher wages, equal opportunity, and digital labor skills. On this merit, such account users shall adopt using the innovative prototype features of own wage price discovery, own wage price spectrum, exchange and redemption of own wage tokens, and, finally, global digital labor markets. Some of these features shall have fee-based levels of use that generate revenue streams. The strategy plans to bootstrap feature development from work performed within government contracts, especially for those let out by the labor department of governments.

Blockchains today, especially when coupled with smart tokens, enable entrepreneurs to deploy digital economies each with their own secure, native currency. Common goals across these digital economies are growth and scale and, notably, hinges on effective incentives for the roles of these economies to spur growth. Designing effective incentives is an art that builds upon on iterative adjustments adjusted towards more transactions per capita. The prototype shall design thresholds that trigger the next iterative adjustment and use rolling data feedback to recursively course correct. One major weakness in defining incentives that are aligned with growth goals are Sybil attacks and variations. With increasing automation, Sybil attacks employ software bots to manipulate economic activity that measures the level of incentive; however, such attacks are best mitigated with strong identity management. Governed identity management shall be a founding requirement for all prototype users, especially since government dollars are involved in activating digital labor across borders. As such, a measured activity can be bound better to economy participants to the extent of strong identity management. of incentive and reward. In order to be trusted custodians of government dollars to subsidy tokens or even government tokens, the design shall provide an auditable system of identity management that follow National Institute of Standards and Technology (NIST) guidelines that reach into backend management of Blockchain accounts, which are bound to these managed identities.

Once strong identity management is in place, then targeted incentives work that much better in meeting economic goals. As such, the incentives, which are backed in value from government subsidies for their unemployment programs, from the reward pool, and from a percentage of platform revenue, serve to reward role players within the labor economy for performing transactions that help grow the labor economy such as posting jobs, posting ask and bid orders in the labor exchange, providing labor exchange liquidity, and executing transactions. Incentive design shall be based on parameters that are driven by data within recursive deep-learning models that use feedback to ensure continued growth of the labor economy, such as transaction volume, posting activity, activation rates, and new accounts. Mandated inflation to fund the annual reward pool for distribution, with any remaining pool balance to be burned, shall be another key innovation to align the growth of the labor economy activity with its incentives.

Figure 12:
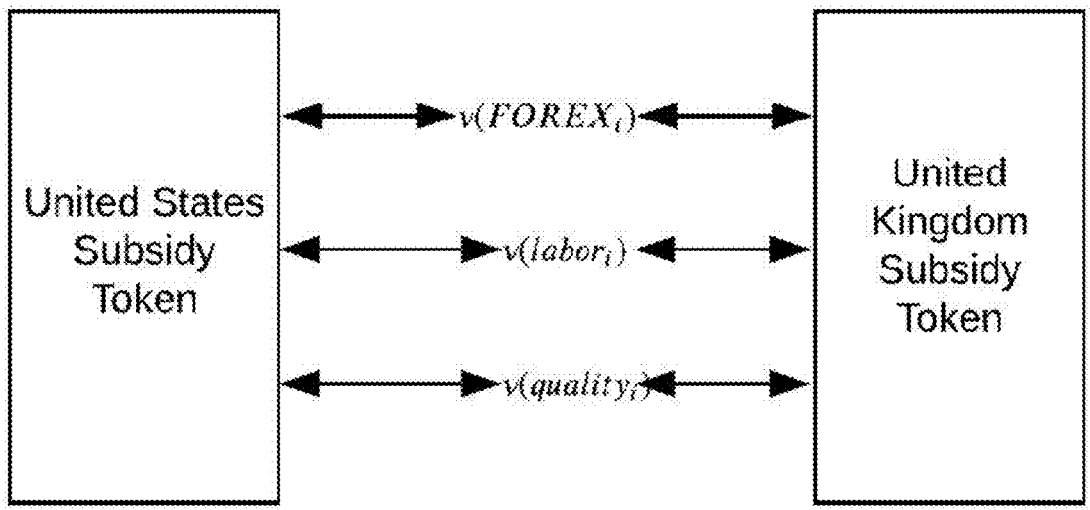
FIG. 12 is an exemplary representation for normalizing funds for labor markets between countries based on respective national currencies using a foreign exchange (FOREX) market, in accordance with some embodiments.

Blockchain or distributed ledger technologies, in policy and program, continue to seek wide government acceptance. An important focus on the design is government compliance with identity management, as mentioned previously. In this light, the prototype shall execute on government unemployment and labor policies and goals, not only nationally, but also internationally, thus also affecting trade policies and goals. A key innovation that shall enable cross-border, digital labor is the normalization of labor markets which account for GDP differences between national economies. Government subsidies are key components of bi-lateral normalization between two significantly different country economies. Additionally, triggers for subsidy application can be complicated in its accounting of aggregate trade in labor markets to account for any bi-lateral imbalance. Normalization in activation functions seek to level imbalance across labor demand and supply so that differences in labor protection, GDP, and fraud prevention, do not prevent activation. One key factor in normalizing activation between countries is a compiled index, across the largest FOREX markets, for the respective national currencies. This compiled index serves to baseline the value ratio between labor demand and supply for leveling a government subsidy to that value ratio, along with other indexes, as can be seen in FIG. 12.

A primary objective of the prototype is to deliver the stated design innovations, proven by experiments and powered by blockchain, for labor economic models, that can significantly augment existing government employment programs around more effective activation of their unemployed and working poor.

Figure 13:
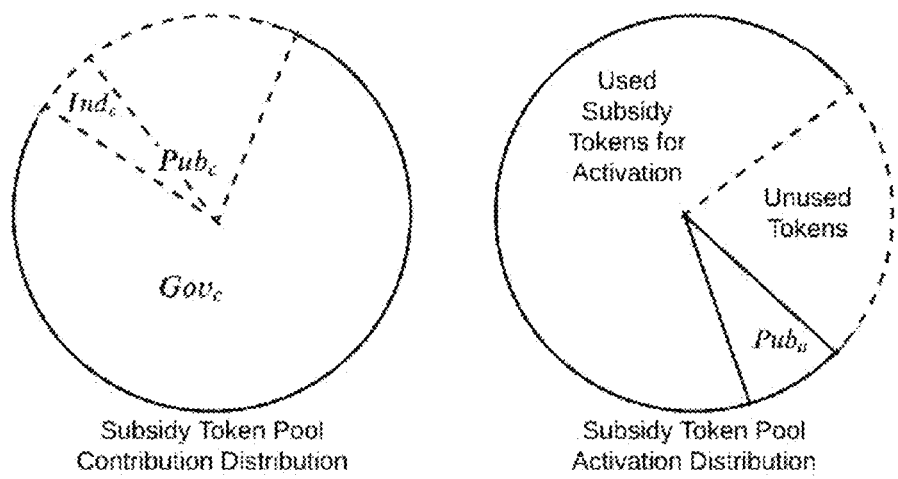
FIG. 13 is an exemplary representation of an incentive model for staking of government-subsidized digital tokens on a platform associated with the marketplace, in accordance with some embodiments.

Token Dynamics:

Three of the major objectives are of token types and their dynamics. The subsidy token type bridges the gap between the best bid and ask in the labor exchange to activate the unemployed and working poor. This allows a government to better apply employment program resources than conditional unemployment disbursements since each subsidy application results in activated labor. In this example, when a subsidy is applied to initiate a multi-signature transaction, the transaction is not settled and finalized until the contracted job is complete. A contracted job is complete once two out of three signatures are present in the transaction. In a typical arrangement, the buyer, seller, and the platform make up all three signatures. The subsidy token lifecycle starts with a government funding event that sets the starting funding level for the government fiscal year to run its employment program and creates a subsidy pool for the subsidy tokens. When subsidy tokens are distributed to initiate labor market orders, government-funded subsidy tokens are expended before any public-funded subsidy tokens. On any expenditure of public-funded subsidy tokens, a government reward token is returned at the next quarterly reward disbursement and upon a public staking of subsidy. A public staking of subsidy involves, for example, an individual who decides to stake an amount of a particular government subsidy token into the pool, for a potential return. It remains staked until the end of the pool's fiscal year, at which the entire staked amount is returned. The lifecycle and transactions are managed independent of the platform in a public smart contract, allowing for unprecedented public transparency of a government blockchain-based government program, as can be seen in FIG. 13.

Figure 14:
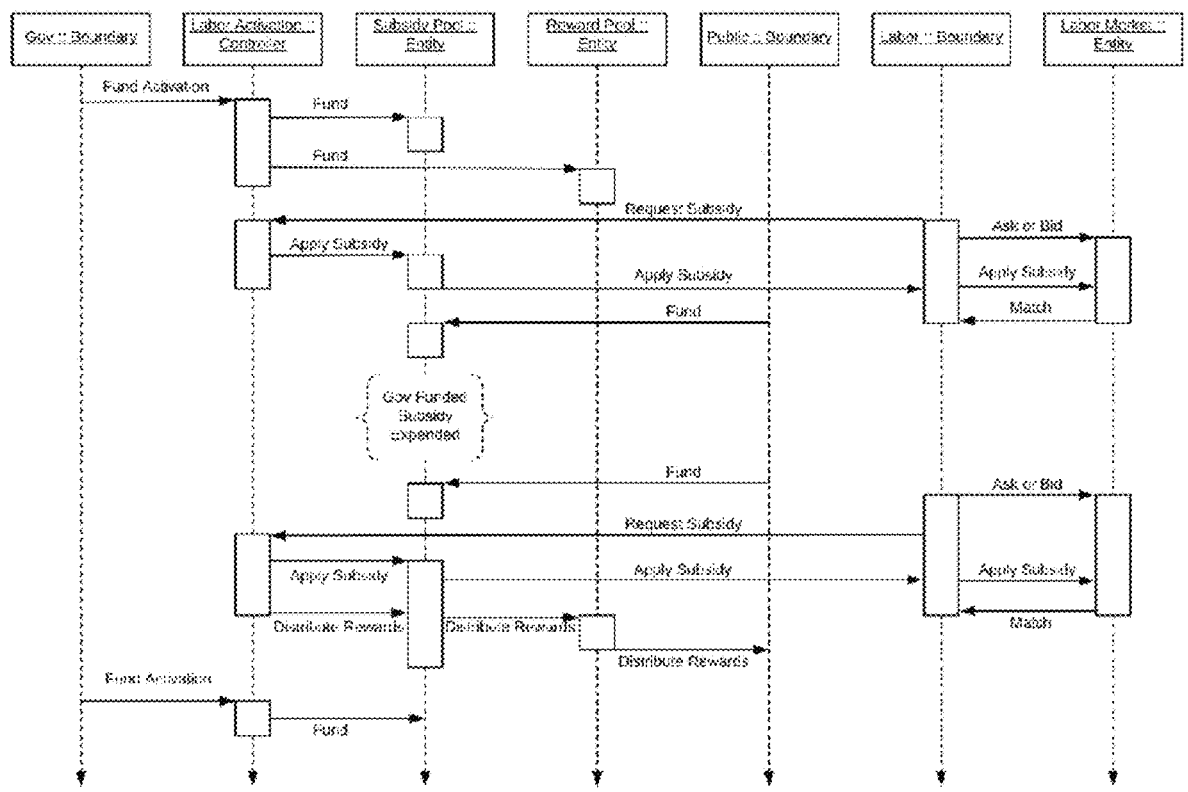
FIG. 14 is a sequence diagram associated with subsidizing and rewarding digital tokens on a platform associated with the marketplace, in accordance with some embodiments.

The government reward token type also has a lifecycle, similar to the government subsidy token type, in that it also has a government funding event that starts its fiscal year lifecycle. The reward token is an incentive that is initially funded by the government to spur public staking of the subsidy token, especially to mitigate any risk of expending all government funded subsidy tokens before the end of the fiscal year. The platform shall account for any disbursements due at every quarter end to the people amongst the public staking subsidy tokens. Any remaining reward amount at fiscal yearend is returned to the government to either rollover or remove from the system. Any remaining staked subsidy tokens are returned to the individual at fiscal yearend. These government unstaked subsidy tokens shall always be redeemable for an equivalent government fiat value. As with the government subsidy token, a public smart contract also manages the transactions and lifecycle of the government reward token, which allows for transparency of reward distribution and, subsequently, evaluation of its fairness and adherence to published rules. The reward is not triggered until government-funded subsidy, at the start of a quarter period, is completely expended, at which point, any public-funded subsidy is used to complete labor transactions. People using public-funded subsidy tokens will be eligible for a reward for that quarter. At the next quarter, the government can choose to fund subsidy and reward, or any combination, which resets the trigger for reward distribution, as can be seen in FIG. 14.

The third objective token type is a labor economy incentive token. It is similar to the role of the government reward token but is a broad-based incentive, that rewards activities and transactions that promote the growth of the labor economy. An initial sampling will include evaluating response to reward signals for transactions such as making labor markets, performing quality assurance actions, performing arbitration actions, placing labor market asks or bids, and rating buyers and sellers. This sampling shall be feed into incentive token design involving training models on supervised deep learning methods. The period shall experiment with different deep learning architectures to discover the most relevant features in determining effective labor economy transactions which should trigger incentive distribution as a reward for promoting significant labor economy growth. The final architecture on this incentive model shall result from transaction data pulled from blockchain smart contracts and from the platform (i.e. exchange, orders, account activity). On this supervised learning, the prototype seeks to reward human behaviors that contribute most to the transaction volume of the labor economy. A large labor economy offers more opportunities for smaller governments to achieve the activation targets within the program budget.

Figure 15:
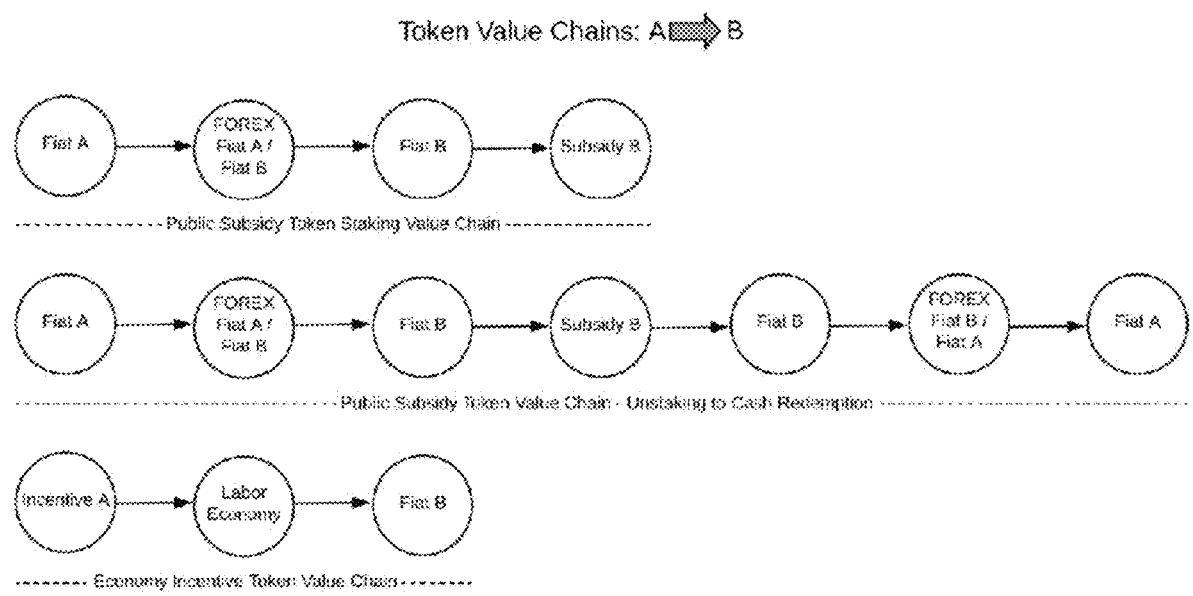
FIG. 15 is an exemplary representation of major value transfers for the digital tokens on a platform associated with the marketplace, in accordance with some embodiments.

Token Valuation:

An objective around token valuation shall be rooted in indexing the largest foreign exchange (FOREX) markets so that fair value transfer can occur when the global public wishes to stake subsidy tokens for any particular government employment program which shall start with the incoming native government currency from which to perform value transfer into the receiving government subsidy program. The valuation behind a government subsidy token is the native government currency itself, which the native government uses to fund subsidy at the start of the fiscal year and, optionally, at every subsequent quarter start. Redemption of reward and of unstaked subsidy tokens results in the cash value of the redeemer's native government currency, rooted in a value chain that depends on FOREX. The disclosure disclosed 3 major value transfers that shall be available on the platform, wherein each transfer follows along its token value unstacked chain, starting with a root value as it traverses the intermediary nodes to the final node, as can be seen in FIG. 15.

For value transfer between different government subsidy tokens, FOREX markets are used to find fair transfer ratios, since the value chain usually ends at fiat cash redemption. However, for the labor economy incentive token, valuation is based on the underlying value of the labor economy. As the labor economy grows, so will the labor economy incentive token. Elements within the labor economy that directly funds redemption value for the labor economy incentive token come from platform fees from account services (i.e. create, government program reports, identity management services, etc.), labor market exchange fees, arbitration fees, and other charges. A goal is to design rules that fund incentive value from the labor economy elements such as a straight percentage of the rake on fees aggregate.

Platform Governance, Arbitration, and Roles:

The objectives define roles within the labor economy for governing quality and resolving disputes between labor buyers and sellers. Quality assurance includes providing roles that perform duties from a certified basis. For example, in software development, automated tests and peer reviews are often included in project requirements. Governing quality needs to include platform rules and rewards for these labor economy roles and, payment for these assurance activities would be contingent on the finalized labor transaction achieving, at least, two out of three digital signatures, thereby releasing token transfer and finalization. Payment for quality assurance would be included in the initial labor bid order; however, it is an optional item, as risk management appetites differ across bids. Quality assurance is just one of many possible requirements that are put together as a larger labor bid. As a practice, an individual or team reviews each of the bid requirements and decides whether to provide a matching ask, which may require a government subsidy.

Strong identity management is required to mitigate any abuse and fraud of labor performing multiple roles against bid quality assurance requirements, especially if the roles need to be independent. Additionally, strong identity management is required for platform validation of certifications from international standards bodies like International Organization for Standardization (ISO) and Institute of Standards of Cambodia (ISC). Validation of certifications is an example of platform costs and not necessarily a cost element of any labor bid; however, if included, the labor bid can be assured of the platform's strong identity management behind a matching ask's claims on required certifications. Strong identity management controls as per international and national standards such as ISO and Defense Information Systems Agency (DISA), shall be defined to meet government identity standards, including those for banking and finance.

Figure 16:
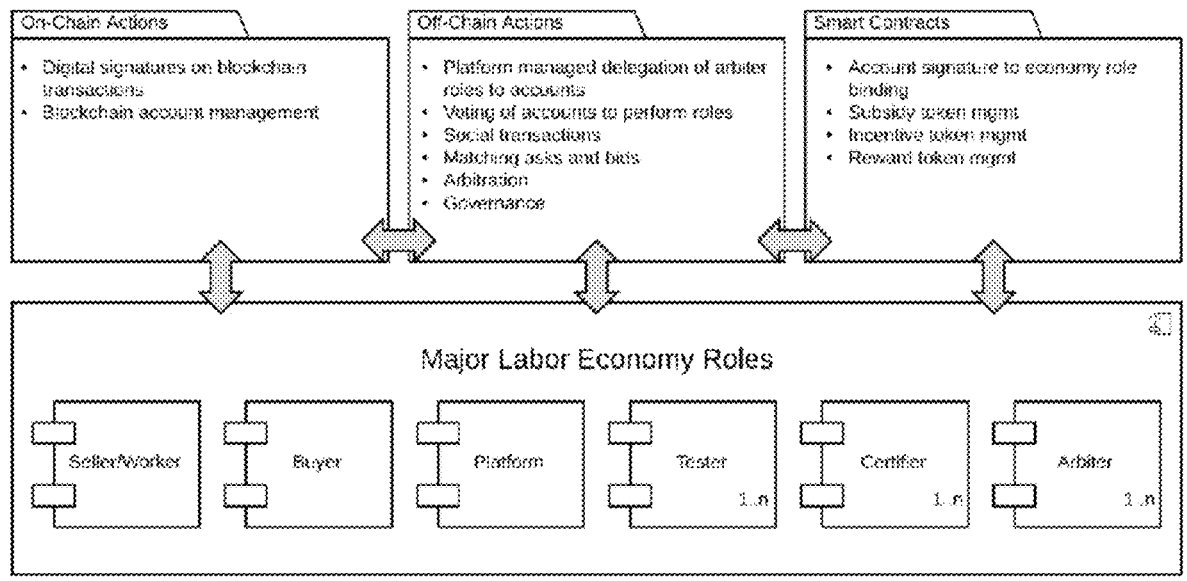
FIG. 16 is an exemplary representation of major roles in a labor economy associated with the marketplace, in accordance with some embodiments.

In the labor market, when bids and asks are matched, the tokens associated with the matching transaction await two out of three signatures, before the transaction is finalized. So, in a normal, undisputed transaction, the labor buyer and seller both sign off on a transaction, in which the buyer signs upon satisfactory receipt of labor completion, including any requirements on quality assurance and certifications. When the buyer refuses to sign a transaction, the platform can sign after arbitration role players provide consensus on whether the labor met all contracted requirements put out in the bid. Without, at least, two signatures, the tokens are returned to the buyer after the bid's stated period of performance, to include any period for rework. In short, this requires a set of properties for each bid: (1) requirements on the product or service; (2) periods of performance and rework; and (3) third party requirements. Each of these properties shall be processed by a smart contract to determine whether a labor transaction is complete or not. Past completeness is when the smart contract checks for two out of three on-chain, digital signatures to determine a transaction's final state. The major roles required in the labor economy shall be codified into smart contracts and platform software rules. Such roles shall be centrally managed entities that are referenced in smart contracts as blockchain accounts to validate that any required actions from these roles have been performed on-chain. Central management includes off-chain transactions such as any social and historical record of role actions, delegation, and voting, as examples, as can be seen in FIG. 16.

Smart Contracts:

The architecture disclosed herein shall include the deployment of prototyped smart contracts on the EOS blockchain. For each of the major objective token types, subsidy, reward, and incentive, there shall be a smart contract managing the lifecycles of each government instance. Across incentive, subsidy, and reward, common smart contract interface methods include minting, burning, distribution, and transfer. All of which are privileged methods, requiring administration keys to perform; however, transactions are public and transparent, to assure integrity through on-demand public and government auditing of subsidy applications, reward distributions, and incentive distributions. Although account activities can be traced, identity information shall not be attributable, as the binding information is private and managed off-chain on the platform. Privacy controls on the platform shall be designed to be compliant to GPDR international standards.

Outside of privacy, are account attributes such as those that go into role-based controls applied in the smart contracts. There shall be a complete accounting of all smart contract transactions that have a dependency on role and, subsequently, implemented into the applicable smart contract within the architecture. For example, only accounts with the arbiter role shall receive incentive tokens for performing arbitration.

Figure 17:
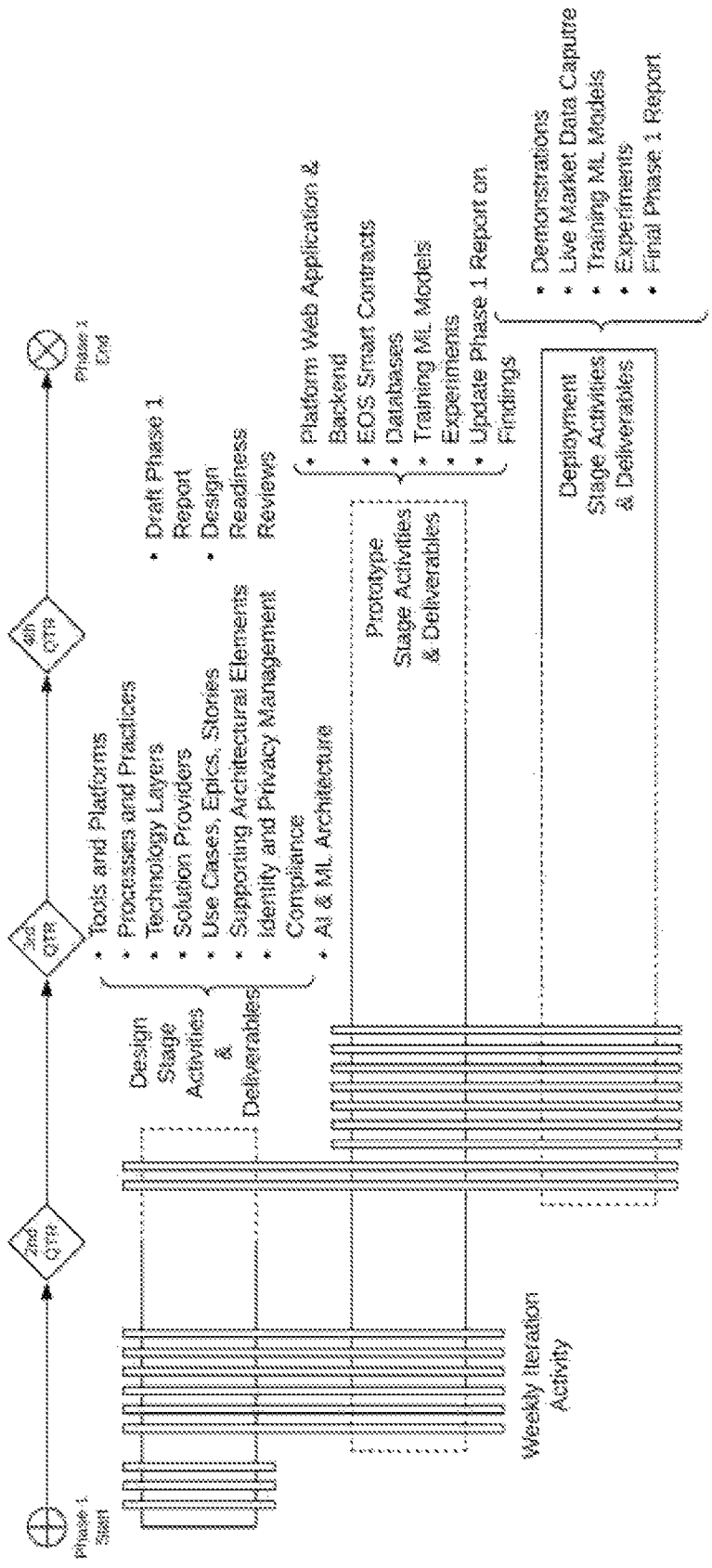
FIG. 17 is an exemplary representation of commercialization of a platform associated with the marketplace, in accordance with some embodiments.

Schedule and Milestones:

The period of performance of the platform disclosed shall consist of multiple, major stages, design, prototype, and deployment. Each major stage shall have frequent weekly, agile, and overlapping iterations resulting in contract deliverables and milestones, as can be seen in FIG. 17. Overlapping iterations between design and prototype represent a capability to rapidly prototype while still in the major design stage, in order to perform iterative redesign as market findings dictate, across experiments and especially for token design. So, as a general guideline to practice, a prototype iteration shall follow a design iteration, resulting in all three stages overlapping considerably; however, the initial few design iterations shall focus on major architecture elements and, accordingly, will not have a corresponding prototype iteration. As such, there shall not be much overlapping between prototype and deployment at the start, since deployment requires a working version of architecture elements. Deployment targets shall include a web application for the platform and the EOS blockchain for smart contracts.

Commercialization Beyond the Platform Disclosed:

Plans for the post the platform disclosed period includes implementing plans to continue account capture across governments to integrate blockchain into the employment programs. To the extent of new capture growth, labor markets become that much more liquid and effective, thereby compelling more account growth and increasing investment from existing government accounts. As the promise of blockchain integration into government programs proves itself in activating global employment, the platform shall scale in order to apply the same model against other government disbursement and benefit programs.

Ultimately, the platform disclosed intends to make capitalistic principles work for all people, regardless of social or economic status, by making government programs more effective on same cost by leveraging global competition into labor markets and roles of the labor economy, as a working example. Equivalently, we imagine that global inclusion into small, focused economies that make up larger national economies, bring global markets and communities closer together and new boundaries form beyond national ones on the basis of common values and not on common nationality, such that the new boundaries will be the future basis for less conflict, more equitable wealth, and with the right strength on identity management, more governments that are grounded on the common needs of the citizens.

Further, the platform disclosed in the disclosure aims to provide for labor markets to form and to bring reputation, previous performance, and competition from same-type, non-local labor markets for price negotiation between the buyer (e.g., employer) and seller (e.g., laborer). Further, the platform aims to build on a growing body of government regulations that implement oversight, protections, and taxation on Blockchain-based models, including a platform model for governance and arbitration. For example, Wyoming is leading the way for state laws to support reciprocal, cross-state cryptographic transactions, distributed ledger banking, and token-based financial services across the biggest market Blockchains, such as Bitcoin, Ethereum, Ripple, and EOS. Further, the platform aims to bridge global wealth inequality gaps, which leverages significant wealth inequality to bring down the inequality by labor market arbitrage forces. With market arbitrage, prices come closer together, which make global inequality gaps shorter, much the same way as international trade does.

Although the invention has been explained in relation to its preferred embodiment, it is to be understood that many other possible modifications and variations can be made without departing from the spirit and scope of the invention as hereinafter claimed.

What is claimed is:

1. A method for facilitating a marketplace for blockchain based labor arbitrage, the method comprising the steps of:
    (A) receiving, using a communication device, a job description for a job from a business operator device, wherein the job description is entered to a blockchain stored on a storage device, and wherein the business operator device is granted access to the blockchain, through a processor;
    (B) transmitting, using the communication device, the job description to a plurality of laborer devices, wherein each of the plurality of laborer devices is granted access to the blockchain;
    (C) receiving, using the communication device, at least one proposal for the job from at least one labor device of the plurality of laborer devices, and recording the at least one proposal to the blockchain through the processor;
    (D) transmitting, using the communication device, the at least one proposal to the business operator device;
    (E) receiving, using the communication device, a laborer indication from the business operator device, wherein the laborer indication includes at least one of a preferred laborer and a preference ranking for each of the at least one laborer;
    (F) identifying, at the processor, a primary laborer device of the at least one laborer device from the plurality of laborer devices based on a job indication;
    (G) generating, on the blockchain, at the processor, a smart contract for the job between the business operator device and the primary laborer device;
    (H) receiving, at the communication device, a buy order for the job from the business operator device, wherein the buy order is recorded to the smart contract in the blockchain saved on the storage device through the processor;
    (I) receiving, at the communication device, a job completion indication for the job from the primary laborer device, wherein the buy order is recorded to the smart contract in the blockchain through the processor;
    (J) verifying, at the processor, the job completion indication against the buy order and at least one quality requirement; and
    (K) processing a transaction, at the processor, through transmitting, using the communication device, a compensation of a predetermined amount of cryptographic tokens per the buy order to the primary laborer device, upon successful verification, wherein a signature from each of the business operator device and the primary laborer device is present in the smart contract.

2. The method of claim 1,
wherein the job includes at least one job funded by a government fund;
wherein the government fund includes at least one of an unemployment relief fund, an unemployment insurance fund, an unemployment benefit fund, and a government subsidy;
wherein the at least one business operator device includes at least one government operator device.

3. The method of claim 1, wherein the plurality of laborer devices includes a plurality of unemployed laborer devices.

4. The method of claim 1, wherein the job description includes at least one of a job title, a job purpose, a product or service, a scope of work, and a job requirement.

5. The method of claim 1, wherein the job proposal includes at least one of a willingness of accepting the job, at least one term, and at least one condition.

6. The method of claim 5, wherein the at least one condition includes one of a compensation/salary requirement, a benefit requirement, and a working environment requirement.

7. The method of claim 1, further comprising:
transmitting, using the communication device, at least one record in the blockchain for the at least one laborer device in step (D) to the business operator device through the processor; and
wherein the at least one record includes at least one of past job performance records, skill records, technical certificates, and credentials that are saved in the blockchain in the storage device.

8. The method of claim 7, wherein the at least one record includes at least one on-chain metadata in blockchain for the at least one laborer device.

9. The method of claim 1, wherein the smart contract is configured to require at least two digital signatures from the business operator device, the primary laborer device, and an arbitrator device to release the predetermined amount of cryptographic tokens for the job to the primary laborer device.

10. The method of claim 1, wherein the smart contract includes at least one of a plurality of requirements for the job, a plurality of requirements for periods of job performance and rework, and at least one requirement for job completion quality.

11. The method of claim 1, further comprising:
prompting, using the communication device, the business operator device for sending a predetermined amount cryptographic tokens for the buy order in step (H), wherein the type of cryptographic token is acceptable to the primary laborer device; and
receiving, using the communication device, the predetermined amount of cryptographic tokens, wherein the amount of cryptographic tokens is saved to the blockchain in the storage device.

12. The method of claim 1, wherein the verification of the job completion indication is validated with digital signatures from both the business operator device and the primary laborer device.

13. The method of claim 1, wherein the verification of the job completion indication includes an evaluation of quality requirements for the job completion indication.

14. The method of claim 1, further comprising:
in response to an unsuccessful verification in step (J), receiving, using the communication device, at least one an arbitration indication from at least one of the business operator device and the primary laborer device; and
transmitting, using the communication device, the arbitration indication to at least one arbitrator device for arbitration, wherein the at least one arbitrator device is granted access to the blockchain.

15. The method of claim 14, further comprising:
in response to the arbitration involving a dispute, receiving, using the communication device, signatures of the job completion indication from both the at least one arbitrator device and the business operator device; and
transmitting, using the communication device, a rework order to the primary laborer device through the processor, wherein the rework order includes at least one of a period of rework, at least one requirement of rework, quality of performance.

16. The method of claim 14, further comprising:
in response to the arbitration involving a dispute, receiving, using the communication device, signatures of the job completion indication from both the at least one arbitrator device and the primary laborer device; and
transmitting, using the communication device, a confirmation of satisfactory job completion to the business operator device through the processor, wherein the job completion indication is verified to meet the buy order and requirements.

17. A system for facilitating a marketplace for blockchain based labor arbitrage comprising
at least one processor;
a communication device;
a storage device;
a blockchain for immutably recording labor arbitrage transactions;
at least one application program interface (API) having software instructions that are saved in the storage device and cause the at least one processor to perform operations including:
(L) receiving, using a communication device, a job description for a job from a business operator device, wherein the job description is entered to a blockchain stored on a storage device, and wherein the business operator device is granted access to the blockchain, through a processor;
(M) transmitting, using the communication device, the job description to a plurality of laborer devices, wherein each of the plurality of laborer devices is granted access to the blockchain;
(N) receiving, using the communication device, at least one proposal for the job from at least one labor device of the plurality of laborer devices, and recording the at least one proposal to the blockchain through the processor;
(O) transmitting, using the communication device, the at least one proposal to the business operator device;
(P) receiving, using the communication device, a laborer indication from the business operator device, wherein the laborer indication includes at least one of a preferred laborer and a preference ranking for each of the at least one laborer;
(Q) identifying, at the processor, a primary laborer device of the at least one laborer device from the plurality of laborer devices based on a job indication;
(R) generating, on the blockchain, at the processor, a smart contract for the job between the business operator device and the primary laborer device;
(S) receiving, at the communication device, a buy order for the job from the business operator device, wherein the buy order is recorded to the smart contract in the blockchain saved on the storage device through the processor;

(T) receiving, at the communication device, a job completion indication for the job from the primary laborer device, wherein the buy order is recorded to the smart contract in the blockchain through the processor;

(U) Verifying, at the processor, the job completion indication against the buy order and at least one quality requirement; and (V) Processing a transaction, at the processor, through transmitting, using the communication device, a compensation of a predetermined amount of cryptographic tokens per the buy order to the primary laborer device, upon successful verification, wherein a signature from each of the business operator device and the primary laborer device is present in the smart contract.

18. The system of claim 17, wherein the smart contract is configured to require at least two digital signatures from the business operator device, the primary laborer device, and an arbitrator device to release the predetermined amount of cryptographic tokens for the job to the primary laborer device.

19. The system of claim 17, further comprising:

in response to an unsuccessful verification in step (U), receiving, using the communication device, at least one an arbitration indication from at least one of the business operator device and the primary laborer device; and transmitting, using the communication device, the arbitration indication to at least one arbitrator device for arbitration, wherein the at least one arbitrator device is granted access to the blockchain.

20. The system of claim 19, further comprising:

in response to the arbitration involving a dispute, receiving, using the communication device, signatures of the job completion indication from both the at least one arbitrator device and the business operator device; and transmitting, using the communication device, a rework order to the primary laborer device through the processor, wherein the rework order includes at least one of a period of rework, at least one requirement of rework, quality of performance.

* * * * *